(12) United States Patent
Vashisht et al.

(10) Patent No.: US 11,436,327 B1
(45) Date of Patent: Sep. 6, 2022

(54) SYSTEM AND METHOD FOR CIRCUMVENTING EVASIVE CODE FOR CYBERTHREAT DETECTION

(71) Applicant: FireEye, Inc., Milpitas, CA (US)

(72) Inventors: Sai Vashisht, Morgan Hill, CA (US); Sushant Paithane, Pune (IN); Imtiyaz Yunus Pathan, Bangalore (IN)

(73) Assignee: FireEye Security Holdings US LLC, Milpitas, CA (US)

( * ) Notice: Subject to any disclaimer, the term of this patent is extended or adjusted under 35 U.S.C. 154(b) by 0 days.

(21) Appl. No.: 17/133,379

(22) Filed: Dec. 23, 2020

Related U.S. Application Data

(60) Provisional application No. 62/953,415, filed on Dec. 24, 2019.

(51) Int. Cl.
| | |
|---|---|
| *G06F 21/00* | (2013.01) |
| *G06F 21/56* | (2013.01) |
| *G06F 21/55* | (2013.01) |
| *G06F 21/54* | (2013.01) |

(52) U.S. Cl.
CPC ............ *G06F 21/564* (2013.01); *G06F 21/54* (2013.01); *G06F 21/554* (2013.01); *G06F 21/565* (2013.01)

(58) Field of Classification Search
CPC ...... G06F 21/564; G06F 21/54; G06F 21/554; G06F 21/565
USPC .......................................................... 726/22
See application file for complete search history.

(56) References Cited

U.S. PATENT DOCUMENTS

| | | | |
|---|---|---|---|
| 6,898,632 | B2 | 5/2005 | Gordy et al. |
| 6,941,348 | B2 | 9/2005 | Petry et al. |
| 7,080,407 | B1 | 7/2006 | Zhao et al. |
| 7,080,408 | B1 | 7/2006 | Pak et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Josnel Jeudy
(74) *Attorney, Agent, or Firm* — Rutan & Tucker, LLP

(57) ABSTRACT

One embodiment of the described invention is directed to a computerized method for improving detection of cybersecurity threats initiated by a script. Herein, the method is configured to analyze the script provided as part of a script object by at least (i) determining whether any functional code blocks forming the script include a critical code statement, (ii) determining whether any of the functional code blocks include an evasive code statement, (iii) modifying the script to control processing of a subset of the functional code blocks by avoiding an execution code path including the evasive code statement and processing functional code blocks forming a code path including the critical code statement, and (iv) executing of the modified script and monitoring behaviors of a virtual environment. Thereafter, the method is configured to determine whether the script including cybersecurity threats based on the monitored behaviors.

27 Claims, 12 Drawing Sheets

(56) References Cited

U.S. PATENT DOCUMENTS

| | | |
|---|---|---|
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,719,939 B2 * | 5/2014 | Krasser ............... G06F 21/564 726/24 |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,376 B1 * | 2/2020 | Jung .................. G06F 11/302 |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |

(56) References Cited

U.S. PATENT DOCUMENTS

| | | |
|---|---|---|
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240217 A1* | 10/2007 | Tuvell ............... G06F 21/565 726/24 |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0016339 A1* | 1/2008 | Shukla ............... G06F 21/566 713/164 |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0363598 A1* | 12/2015 | Xu ............... G06F 21/566 726/23 |
| 2015/0372980 A1 | 12/2015 | Eyada |
| 2016/0004869 A1 | 1/2016 | Ismael et al. |

(56) References Cited

U.S. PATENT DOCUMENTS

| | | | |
|---|---|---|---|
| 2016/0006756 | A1 | 1/2016 | Ismael et al. |
| 2016/0044000 | A1 | 2/2016 | Cunningham |
| 2016/0099963 | A1* | 4/2016 | Mahaffey ............ H04L 63/1408 726/25 |
| 2016/0127393 | A1 | 5/2016 | Aziz et al. |
| 2016/0191547 | A1 | 6/2016 | Zafar et al. |
| 2016/0191550 | A1 | 6/2016 | Ismael et al. |
| 2016/0241580 | A1 | 8/2016 | Watters et al. |
| 2016/0241581 | A1 | 8/2016 | Watters et al. |
| 2016/0261612 | A1 | 9/2016 | Mesdaq et al. |
| 2016/0285914 | A1 | 9/2016 | Singh et al. |
| 2016/0301703 | A1 | 10/2016 | Aziz |
| 2016/0323295 | A1 | 11/2016 | Joram et al. |
| 2016/0335110 | A1 | 11/2016 | Paithane et al. |
| 2017/0083703 | A1 | 3/2017 | Abbasi et al. |
| 2018/0013770 | A1 | 1/2018 | Ismael |
| 2018/0048660 | A1 | 2/2018 | Paithane et al. |
| 2018/0069891 | A1 | 3/2018 | Watters et al. |
| 2018/0121316 | A1 | 5/2018 | Ismael et al. |
| 2018/0288077 | A1 | 10/2018 | Siddiqui et al. |
| 2019/0104154 | A1 | 4/2019 | Kumar et al. |
| 2019/0132334 | A1 | 5/2019 | Johns et al. |
| 2019/0207966 | A1 | 7/2019 | Vashisht et al. |
| 2019/0207967 | A1 | 7/2019 | Vashisht et al. |
| 2020/0252428 | A1 | 8/2020 | Gardezi et al. |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al., UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K, (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

(56) References Cited

OTHER PUBLICATIONS

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard fora NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.-N-Version Antivirus in the Network Cloud, 17th USENIX Security Symposium USENIX Security 'Jul. 2, 0088-Aug. 1, 2008 San Jose, CA.

Reiner Sailer, Enriquillo Valdez, Trent Jaeger, Roonald Perez, Leendertvan Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

FIG. 3E

```
Attribute Name = "Malicious code"
Sub AutoOpen ( )  ◄────── 350₁
    RunMe
End Sub Function RunMe ( )  ◄────── 350₂
350₃    getReturnUName = Environ ("userdomain")
   └──► If ((getReturnUName = "CORP") Or True Then
350₄            TempWrt
   └──► Else
                Application.Quit ◄────── 357
        End If                              ─ 385
End Function 350₅ Function TempWrt ( )
   └──► On Error Resume Next
        Dim wsh As Object
        Set wsh = CreateObject ("WScript.Shell")   ─ 358
      ⎧ Srt = "powe"
      ⎪ Srt = Srt + "rshel"
      ⎨ Srt = Srt + "l.exe" <First Parameters>
      ⎩ Srt = Srt + <Second Parameters>
        Srt = Srt + "cwBhAGwaIAdBhAATg16mmcALQBPAGIAagB1AGmkkIMBVOOpMKHDUTR"
        Srt = Srt + "waIAdBhAATg16mmcALQBPAGIAagB1AGmkkIMOpMKHDUTRkl8nn3UDHT"
```

～～～～～～～～～～～～～～～～～～～～～～～～
～～～～～～～～～～～～～～～～～～～～～～～～
～～～～～～～～～～～～～～～～～～～～～～～～
～～～～～～～～～～～～～～～～～～～～～～～～
～～～～～～～～～～～～～～～～～～～～～～～～
～～～～～～～～～～～～～～～～～～～～～～～～
～～～～～～～～～～～～～～～～～～～～～～～～
～～～～～～～～～～～～～～～～～～～～～～～～

```
        wsh.Run Srt, 0
        On Error GoTo 0
End Function
```

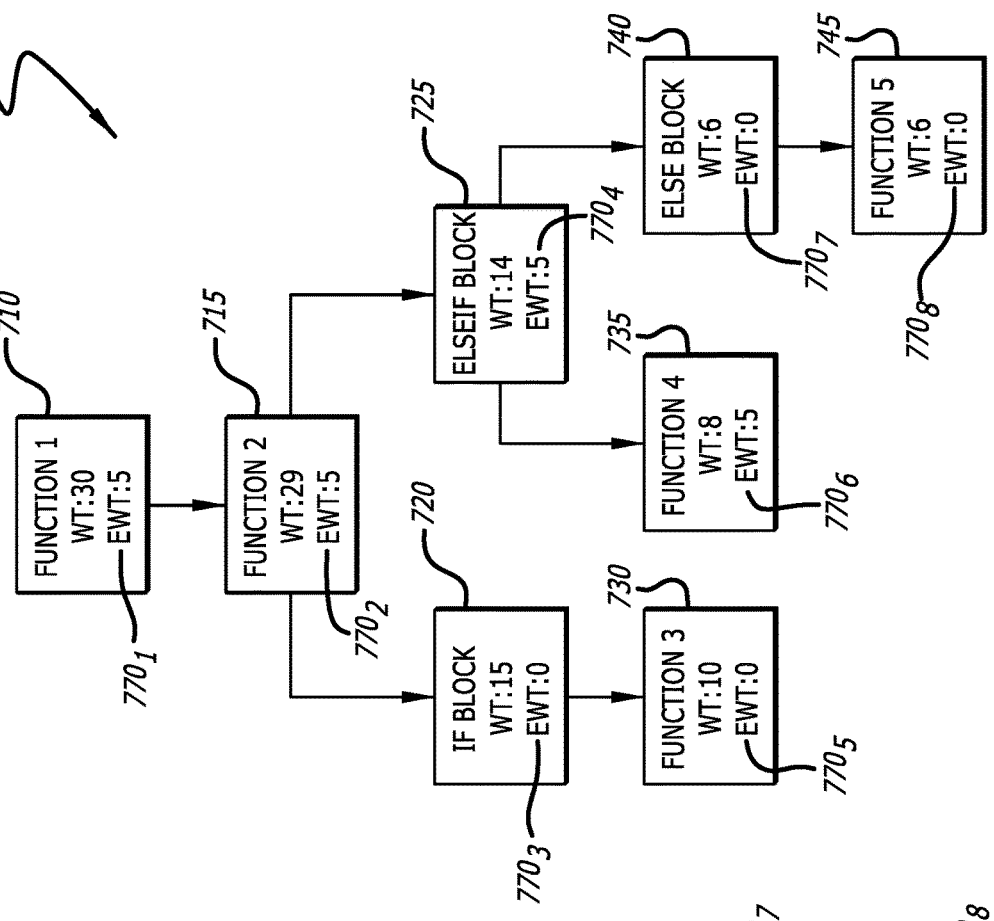
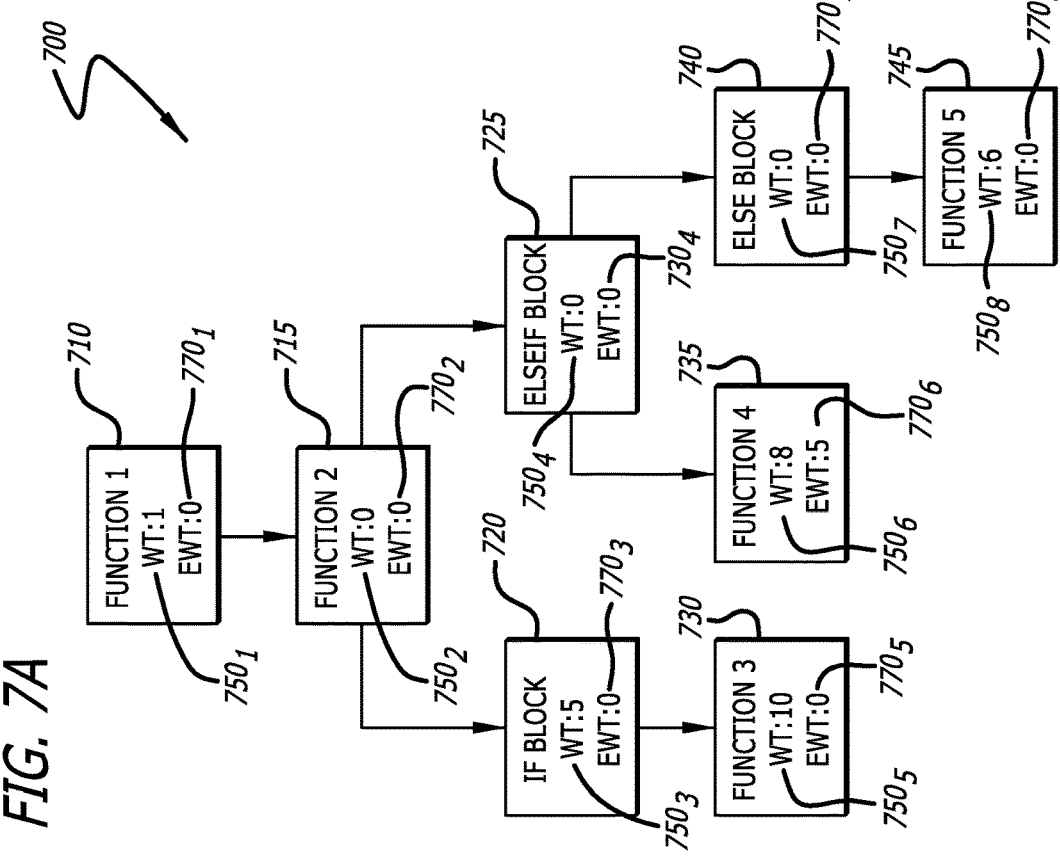
FIG. 7A
FIG. 7B

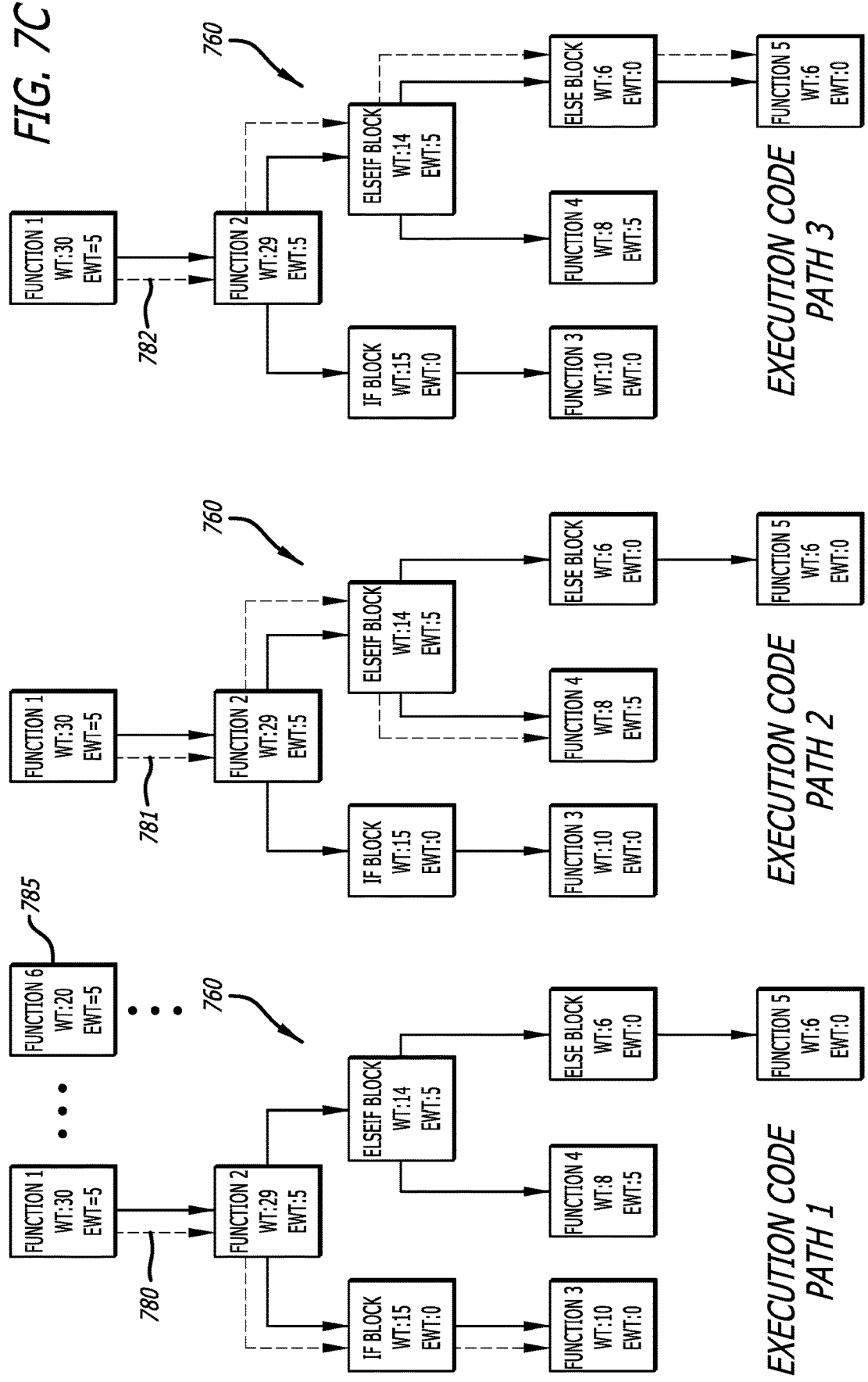

SYSTEM AND METHOD FOR CIRCUMVENTING EVASIVE CODE FOR CYBERTHREAT DETECTION

CROSS-REFERENCE TO RELATED APPLICATIONS

This application claims the benefit of priority on U.S. Provisional Application No. 62/953,415 filed on Dec. 24, 2019, the entire content of which are incorporated by reference herein.

FIELD

Embodiments of the disclosure relate to the field of cybersecurity. More specifically, one embodiment of the disclosure relates to a system configured to improve detection of cybersecurity threats (hereinafter, "cyberthreats") that are initiated by scripts having code to evade detection, and the corresponding method thereof.

GENERAL BACKGROUND

Conventional cybersecurity devices are designed to detect cyberthreats caused by an executable within an object, such as a file, electronic mail (email) message or web content for example. When processed, the executable causes a targeted device to perform unauthorized, unexpected, anomalous, and/or unwanted behaviors or operations (hereinafter, "malicious behaviors"). These malicious behaviors may be conducted automatically or may be conducted in response to human interaction prompted by the executable.

Currently, to detect cyberthreats, cybersecurity devices deploy an analysis system. One type of analysis system features a virtual machine provisioned with one or more software profiles, which are identical or similar to a device targeted to receive the object. The provisioned virtual machine conducts behavioral analyses of the executable or script. Stated differently, the cybersecurity analysis system processes the executable, where the object is deemed to be "malicious" when the cybersecurity analysis system observes malicious behaviors caused by this executable.

Recently, various scripts (e.g., macros or other executable content such as PowerShells, JavaScripts®, etc.) are becoming an increasingly common cybersecurity attack vector. As a result, some security administrators are taking precautions by restricting the execution of unauthorized scripts, especially scripts contained within web content received over a network. However, these restrictions impose a number of disadvantages. For example, one disadvantage is that these restrictions would significantly decrease a user's overall web experience because dynamic content, such as web content controlled by a script for example, would be prevented from being fully displayed. Another disadvantage is that these restrictions would eliminate or mitigate operability of some applications that rely on dynamic scripts.

Furthermore, malicious scripts are more commonly being configured with evasive code, namely code structured to attempt to evade detection, especially when the malicious script discovers that it is being processed within a cybersecurity analysis system. The evasive code may be structured to perform an "active evasion" in which the script performs operations in efforts to evade detection by the cybersecurity analysis system or "passive evasion" in which no malicious behaviors are conducted until the malicious script detects an occurrence of a specific event (e.g., user interaction evidenced by mouse movement, selection of an object, etc.). In accordance with conventional cybersecurity techniques, evasive code has additional complexity to the detection of malicious scripts, increasing the difficulty of detecting a cyberattack prior to activation and commencement of execution of the script.

BRIEF DESCRIPTION OF THE DRAWINGS

Embodiments of the invention are illustrated by way of example and not by way of limitation in the figures of the accompanying drawings, in which like references indicate similar elements and in which:

FIG. 3E is an exemplary embodiment of a representation of a modified script object generated by the script code modification logic deployed within the multi-stage analytic engine of FIG. 3A.

FIG. 7A is an exemplary embodiment of an illustrative conditional flow graph of a script object.

FIG. 7B is an exemplary embodiment of the weighted, prioritized condition flow graph of the script object of FIG. 7A.

FIG. 7C is an exemplary embodiment of the representative code execution paths to be analyzed during different processing cycles conducted by the third (behavior) analytic stage of the multi-stage analytic engine of FIG. 2.

DETAILED DESCRIPTION

Figure 1A:
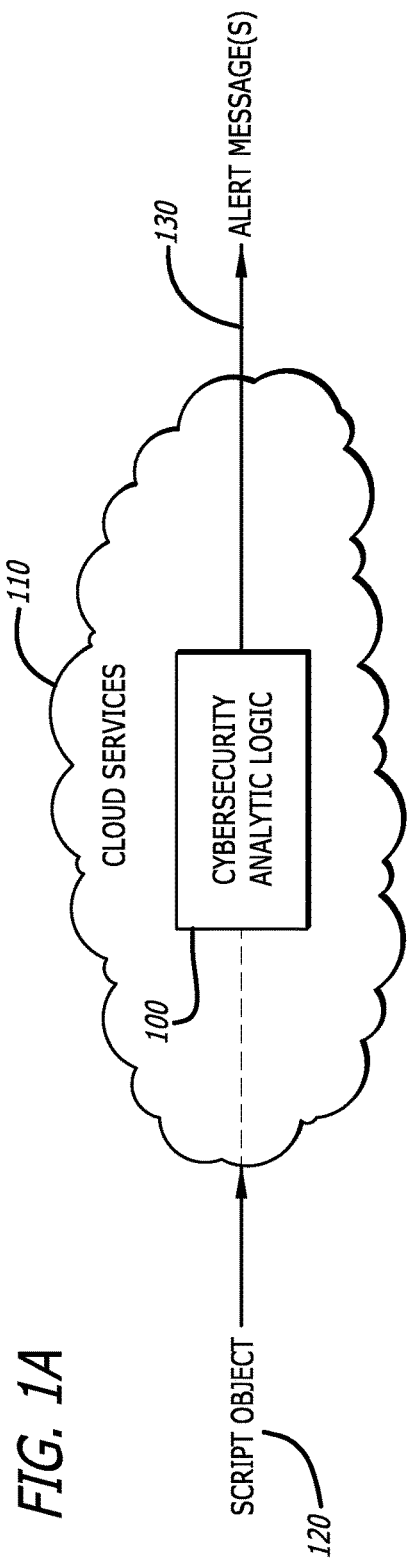
FIG. 1A is a block diagram of an exemplary embodiment of cloud-based cybersecurity system including cybersecurity analytics logic to detect script objects coded to evade malware detection.
Figure 1B:
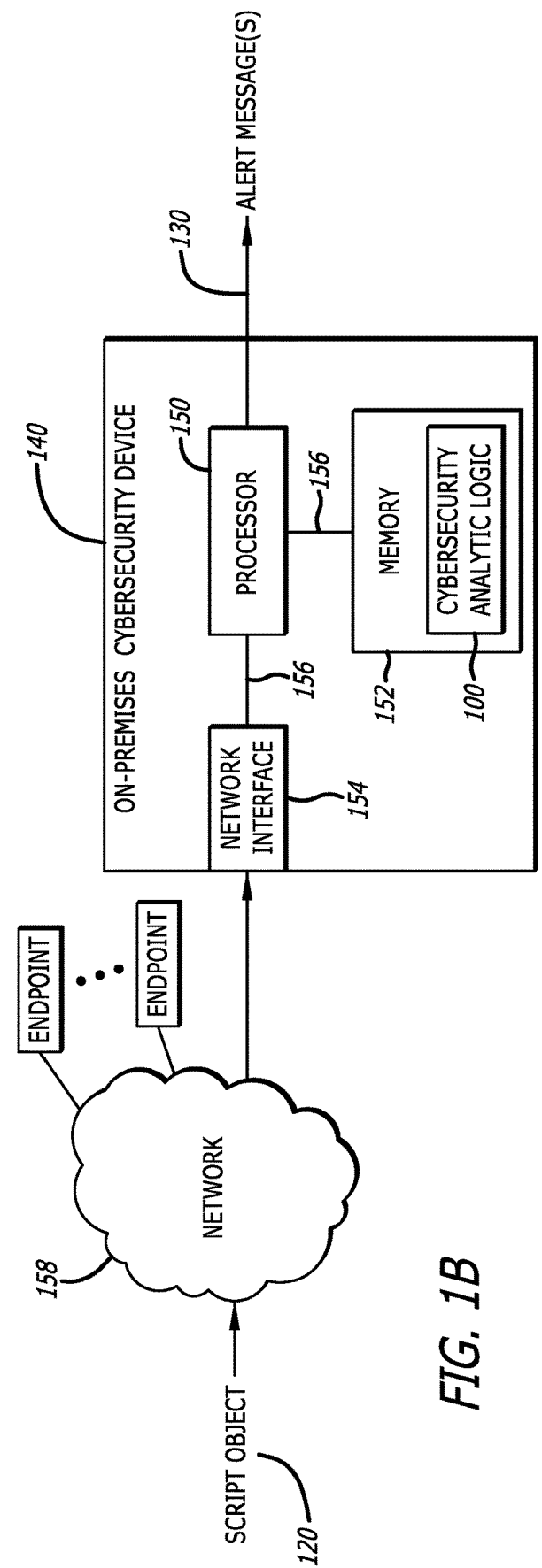
FIG. 1B is a block diagram of an exemplary embodiment of an on-premises cybersecurity system including the cybersecurity analytics logic of FIG. 1A.
Figure 1C:
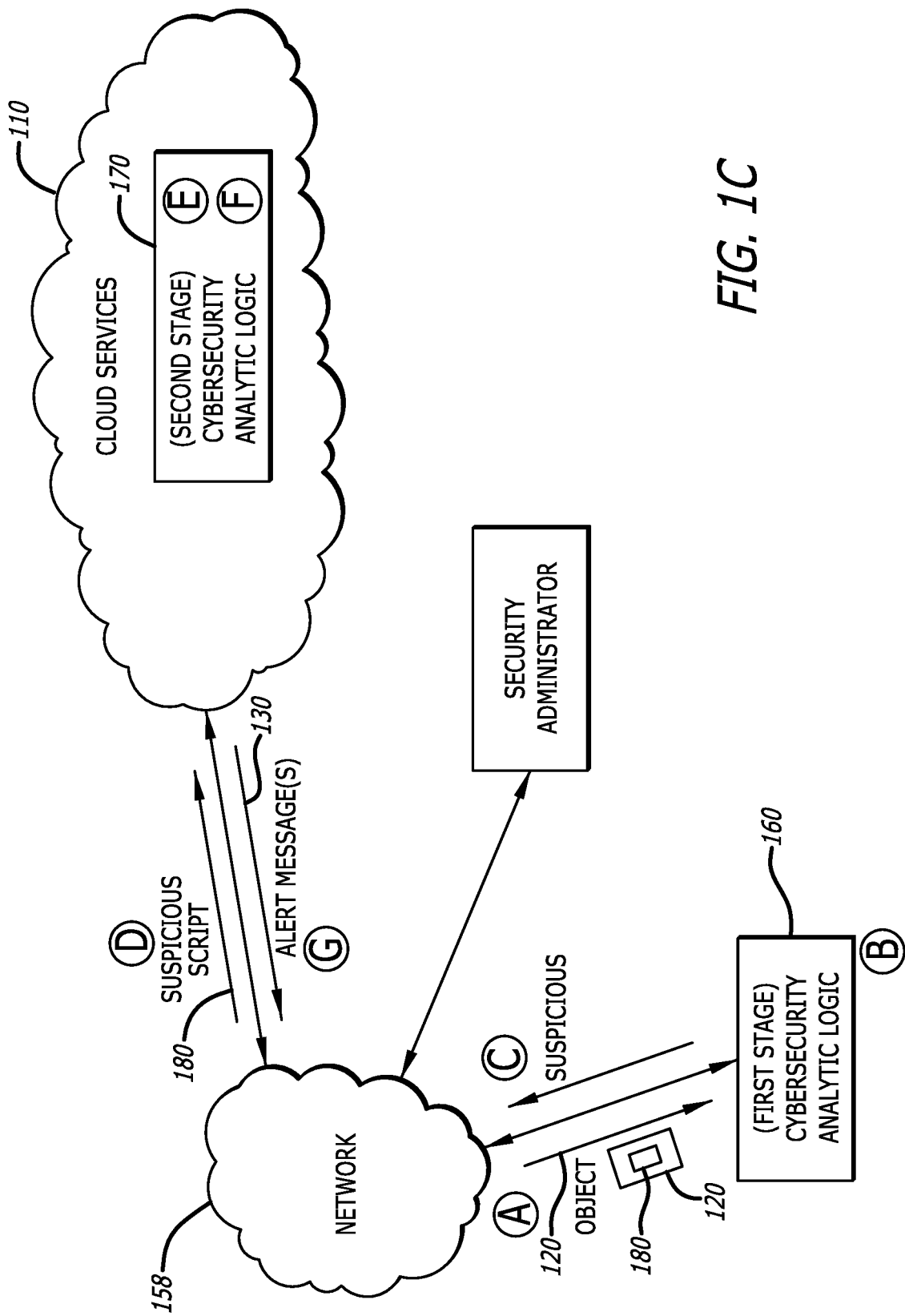
FIG. 1C is a block diagram of an exemplary embodiment of a hybrid deployment featuring an on-premises cybersecurity system that includes a first portion of the cybersecurity analytic logic to detect a suspicious script object and a cloud-based cybersecurity system including a second portion of the cybersecurity analytic logic to determine whether the suspicious script object is malicious.

Embodiments of the present disclosure generally relate to a cybersecurity system that is configured to identify script objects (e.g., objects including one or more scripts) and, for each script object, the cybersecurity system (i) recovers code associated with a script included as part of the script object, (ii) identifies functional code blocks within the recovered code, (iii) identifies "suspicious" functional code blocks which may include a critical code statement and/or an evasive code statement along with their relationships with other functional code blocks, and (iv) encourages execution over a code execution path that includes one or more functional code blocks (hereinafter, "functional code block(s)") including at least one critical code statement while attempting to bypass functional code block(s) including at least one evasive code statement. The cybersecurity system may be deployed to support a cloud service, an on-premises network device, or even a hybrid deployment as illustrated in FIGS. 1A-1C.

Herein, a functional code block is a block of code that includes a plurality of code statements, where the functional code block may be determined to be "suspicious" if the code block include one or more code statements that may constitute a critical code statement and/or an evasive code statement. As a "code statement" pertains to a set (one or more) of instructions that form a portion of software (e.g., program, etc.) and expresses an activity to be performed by that portion of software, a "critical code statement" includes one or more instructions having at least (i) a first level of correlation with code statements associated with known malware and/or (ii) a second level of correlation with code statements associated with known goodware. Additionally, an "evasive code statement" includes a portion of code that halts the script from completing its execution (e.g., terminates, causes a system crash, etc.) or intentionally delays execution of other functional code blocks based on event-driven evasion (e.g., occurrence of an event that prompts execution or non-execution of the code such as a dialog box interfering with script processing) or through a change of control (e.g., one or more BRANCH code statements, IF code statements, IF-ELSE code statements, JUMP code statements, or the like). The presence of an evasive code statement may be ascertained by determining at least (i) a first level of correlation between the evasive code statement and code statements associated with known malware with evasive capabilities and/or (ii) a second level of correlation between the evasive code statement and code statements associated with known goodware. The levels of correlation may be the same or may differ from each other.

According to one embodiment of the disclosure, the cybersecurity system features cyberthreat analytic logic, which includes a multi-stage analytic engine, a classification engine, and an alert engine. The multi-stage analytic engine is configured to generate and collect event data (also referred to as "behaviors"), namely information associated with the operations of an isolated, virtual environment processing the script object. The classification engine is configured to determine whether the script object is malicious based on the collected behaviors while the alert engine is configured to report the results associated with the analyses performed on a script associated with the script object by the multi-stage analytic engine and the classification engine.

For an embodiment of the invention described below, the multi-stage analytic engine includes a first (initial) analytic stage, a second (intermediary) analytic stage and a third (behavior) analytic stage. Herein, the first analytic stage is configured to conduct an initial evaluation of an incoming object to determine whether the object includes a script (constitutes a script object), given that script objects are commonly being used as cybersecurity attack vectors. The second analytic stage is configured to generate a weighted conditional flow graph by at least (i) identifying whether any functional code blocks potentially include a critical code statement, (ii) identifying whether any functional code blocks potentially include an evasive code statement, and (iii) assigning cybersecurity metrics (e.g., certain indicia such as weights or other parameters) to identify which of these functional code blocks may include a critical code statement and/or an evasive code statement, where these cybersecurity metrics may be used to identify code execution paths that are directed to malware and/or evasive code. The second analytic stage is further configured to modify code within the script object to attempt to direct execution along code execution paths featuring one or more functional code blocks including at least one "critical" code statement and thereby, at least initially, bypass code execution paths directed to evasive code. The modification of the code within the script may enable execution of certain functional code blocks having at least one critical code statement earlier than would occur in normal execution.

The third analytic stage of the multi-stage analytic engine is configured to collect behaviors generated during execution of the modified script, namely behaviors generated by functional code blocks associated with the code execution paths starting with the one or more critical code execution paths. As described below, the second analytic stage may support iterative modification of the script to control the execution flow of code within the script so as to collect behaviors of functional code block(s) along critical code execution path(s) and initially avoid the evasive code path(s).

More specifically, the first analytic stage is configured to conduct an initial classification of an incoming object to determine whether the object is "suspicious" or "benign." According to one embodiment of the disclosure, the object may be initially classified as "suspicious" when the object includes one or more scripts (i.e., constitutes a script object). Optionally, the first analytic stage may be configured to conduct further analyses, such as a comparison of certain content within the script object (e.g., source of the script object, etc.) with black list content to determine whether the script object is malicious. Responsive to an initial malicious classification, the first analytic stage may bypass further analyses of the script object by the second analytic stage and/or the third analytic stage, as described below. For convenient, a visual representation of the conditional flow graph is provided, although the content of the conditional flow graph includes code blocks and context information obtained from the control flow (e.g., which functional code blocks prompts execution of another functional code block, whether the functional code block is conditional thereby being a starting point for multiple execution code paths therefrom, etc.)

The second (intermediary) analytic stage features conditional flow graph generation logic, functional code block weighting logic, code execution path prioritization logic, script code coverage logic, script code modification logic, and a data store. According to one embodiment of the disclosure, the conditional flow graph generation logic receives the script and generates a conditional flow graph representing the functional code blocks and the relationships between the functional code blocks forming the script. The functional code blocks forming the conditional flow graph are made available to the functional code block weighting logic.

Herein, according to one embodiment of the disclosure, the functional code block weighting logic analyzes the content of the functional code blocks and identifies those functional code blocks that include one or more critical code statements (e.g., code with a prescribed likelihood of being associated with a cyberthreat) and/or one or more evasive code statements, as described above. Thereafter, the functional code block weighting logic assigns threat weight values to the functional code blocks.

Stated differently, the functional code block weighting logic assigns a threat weight value to each of the functional code blocks, where a particular value signifies the likelihood of one or more critical code statements (hereinafter, "critical code statement(s)") being located in that functional code block. The threat weight values associated with a series of functional code blocks identify the likelihood of a particular code execution path including the functional code blocks as being associated with a cyberattack. As an illustrative example, the threat weight value may be determined, at least in part, on the level of correlation between the critical code statement(s) associated with the particular functional code block and critical code statements associated with known malware. Hence, the functional code blocks including critical code statement(s) associated with known malware may be assigned certain threat weight values that are different from those threat weight values assigned to functional code blocks without a critical code statement (e.g., more positive values identify a greater likelihood of maliciousness). Stated differently, the assignment of threat and/or evasive weight values may occur through a mapping between known critical code statements and/or evasive code statements and their corresponding weight values maintained within a data store (see FIG. 2).

Similarly, the functional code block weighting logic assigns an evasive weight value to each of the functional code blocks, where a particular value signifies the likelihood of one or more evasive code statements (hereinafter, "evasive code statement(s)") being located in that functional code block. The evasive weight value may operate as a secondary parameter for use in selecting code execution path when the threat weight values for two functional code blocks along the same layer of the conditional flow graph are equivalent, where a "layer" is identified as a number of "hops" along an execution code flow from a top (or highest) layer, where the top layer occupies the start of an execution code path. Hence, neighboring layers may be associated with functional code blocks that are directly dependent on which other.

Herein, according to one embodiment of the disclosure, the evasive weight values may be determined, at least in part, on the level of correlation between the evasive code statement(s) associated with the particular functional code block and evasive code statements associated with known malware. Hence, functional code blocks including evasive code statement(s) correlated with known evasive code statements may be assigned certain evasive weight values that are different from the evasive weight values for functional code blocks without evasive code statements. For example, the evasive weight value may be greater to identify a greater likelihood of that functional code block including evasive code.

Additionally, the code execution path prioritization logic of the second analytic stage is configured to generated a weighted, conditional flow graph by at least determining the threat weight value associated with each lowest level functional code block(s) represented within the conditional flow graph and propagating this threat weight value upward in the conditional flow graph to neighboring higher-level functional code block(s), until a highest level functional code block within the conditional flow graph is reached. Stated differently, the threat weight value of each "child" functional code block, which is set based on the likelihood of critical code statement(s) residing in that "child" functional code block, is combined with the threat weight value of its neighboring "sibling" functional code block to generate a reassigned threat weight value for "parent" functional code blocks being part of the conditional flow graph. The reassigning of threat weight values continue until a highest layer of the conditional flow graph is reached.

As a result, the code execution path prioritization logic modifies a threat weight value associated with a particular functional code block in the conditional flow graph, provided the particular functional code block includes one or more neighboring, lower-level functional code block(s) that collectively amount to a non-zero threat weight value. This produces top-layer functional code blocks being assigned an aggregate of the collective threat weight values for any lower-layer functional code blocks originating therefrom. Also, code execution paths with different threat weight values may be produced, given that a change of control (e.g., a BRANCH code statement, IF code statement, IF-ELSE code statement) may feature conditional functional code blocks with different threat weight values, as illustrated in FIG. 3D or FIG. 7B and described below. The code execution path prioritization logic is also configured to propagate any evasive weight values so that functional code blocks including evasive code statement(s) may be identified and their corresponding code execution path may be bypassed where functional code blocks along different execution paths are equal in threat weight value, but one of the functional code blocks suggests a presence of evasive code.

Thereafter, the code execution path prioritization logic is configured to store the content associated with the conditional flow graphs (e.g., content of the functional code blocks, threat (and/or evasive) weight values associated with these functional code blocks, relationships such as one or more code execution paths to which a functional code block pertains, etc.) within a data store that is accessible by the script code coverage logic. The script code coverage logic is configured to initially select, for processing and analysis, the code execution path within the conditional flow graph with the highest likelihood of its functional code blocks including a critical code statement. Upon selection of the particular critical code execution path, the script code modification logic may be configured to alter content (code) of the script to allow for execution of the script over the selected critical code execution path and avoid functional blocks with high evasive weight values. This enable the behavioral analytic stage to initially avoid evasive code and concentrate on portions of the script that may include malware. This avoidance may continue by selecting different critical code execution paths over the same execution thread in efforts to delay execution of the functional code blocks that potentially include evasive code statements.

In summary, based on prioritization of code execution paths as described above, the second analytic stage may be configured to initially bypass evasive code within the script in efforts to execute the code associated with critical code statements that would have been avoided (or at least delayed) during normal execution of the script, as the evasive code within the script may be analyzed to provide complete analytics of the script. The bypassing of evasive code may lead to a more accurate classification of the script object by avoiding code designed in efforts to obfuscate a presence of malware within the script.

Once some or all of the code execution paths have been analyzed, the behavioral analytic stage may determine a verdict (e.g., malicious, benign, or perhaps still suspicious requiring further analysis) for the script object. In particular, for each code execution path, the behavioral analytic stage receives the modified script and, in response to the processing of the modified script, behaviors are observed and stored within an event log. According to one embodiment of the disclosure, the behavioral analytic stage may include, for example, a virtualization engine for generating a virtual machine instance configured with a guest image (e.g., containing an operating system and one or more applications). Herein, the script is modified and run multiple times (iterative) to cover some or all non-zero weighted execution paths (depending on the size of the script), which occurs in a single instance of a VM. The guest image is used in establishing a monitored run-time environment in the virtual machine instance used in executing the modified script. The guest image may be factory-provided and configurable and/or customer provided and configurable.

The behaviors along with meta-information identifying the code execution path and thread associated with the script may be stored as part of an event log, which is accessible by the classification engine. The classification engine may assign a maliciousness score to each identified behavior and/or to sets of identified behaviors, based on prior classifications of malware, e.g., verified through reverse engineering of previously identified malware and/or legitimate code. If the maliciousness score exceeds a threshold, the submitted script object is classified as malicious. If the script object is classified as malicious, an alert (e.g., "threat warning" text or other electronic message or a displayable report) may be generated and issued by the alert logic via a communication interface, for example, to a security administrator.

I. Terminology

In the following description, certain terminology is used to describe aspects of the invention. In certain situations, the terms "logic" and "engine" are representative of hardware, firmware, and/or software that is configured to perform one or more functions. As hardware, the logic (or engine) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or engine) may be software in the form of one or more software modules, which may be configured to operate as its counterpart circuitry. For instance, a software module may be a software instance that operates as a processor, namely a virtual processor whose underlying operations is based on a physical processor such as an EC2 instance within the Amazon® AWS infrastructure for example.

Additionally, a software module may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, a portable memory device, or storage instances as described below. As firmware, the logic (or engine) may be stored in persistent storage.

The term "computerized" generally represents that any corresponding operations are conducted by hardware in combination with software and/or firmware.

The term "malware" is directed to software that produces a malicious behavior upon execution, where the behavior is deemed to be "malicious" based on customer-specific rules, manufacturer-based rules, or any other type of rules formulated by public opinion or a particular governmental or commercial entity. This malicious behavior may include any unauthorized, unexpected, anomalous, and/or unwanted behavior. An example of a malicious behavior may include a communication-based anomaly or an execution-based anomaly that (1) alters the functionality of an electronic device executing that application software in a malicious manner; and/or (2) provides an unwanted functionality which is generally acceptable in other context.

The term "network device" should be generally construed as physical or virtualized device with data processing capability and/or a capability of connecting to any type of network, such as a public cloud network, a private cloud network, or any other network type. Examples of a network device may include, but are not limited or restricted to, the following: a server, a router or other intermediary communication device, an endpoint (e.g., a laptop, a smartphone, a tablet, a desktop computer, a netbook, IoT device, industrial controller, etc.) or virtualized devices being software with the functionality of the network device.

The term "conditional flow graph" generally refers to a collection of information, including segments of code directed to one or more functions (e.g., a functional code block) along with information associated with the relationships between these segments of code. Visually, the conditional flow graph may be represented using graph notifications, in which each segment of code may be represented by a node and the information associated with the relationships between these segments of code (e.g., the control flow) may be represented by edges (lines) between the nodes. The information may identify one or more code execution paths to which a functional code block pertains, especially where changes of control occur in which a flow of execution from one functional code block may propagate to one or more different functional code blocks depending on state information at the time of execution.

The term "message" generally refers to as information placed in a prescribed format that is transmitted in accordance with a suitable delivery protocol or accessible through a logical data structure such as an Application Programming Interface (API). Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. For example, a message may be provided as one or more packets, frames, or any other series of bits having the prescribed, structured format.

As described herein, cybersecurity analytic logic may be deployed, for example, as a part of a "cloud-based hosted service," a "hosted service," or a combination thereof, any of which operates to protect customer cloud-hosted resources maintained within a public cloud network. As a cloud-based hosted service, the cybersecurity analytic logic may be configured to operate as a multi-tenant service; namely a service made available to tenants (also referred to as "customers") on demand via a public network (e.g., Internet). The multi-tenant service may feature virtual resources, such as virtual compute engines and/or virtual data stores for example, which are partitioned for use among the customers in accessing and/or analyzing data maintained within that customer's specific cloud account. The partitioning protects the security and privacy of the customer data. As a hosted service, the cybersecurity analytic logic may be configured as a single-tenant service provided by a customer's own on-premises server(s) to access and collect meta-information from that customer's cloud accounts(s). Examples of a hosted service may include, but is not limited or restricted to a Microsoft® Exchange® server, a file repository, or the like.

In certain instances, the terms "compare," "comparing," "comparison," or other tenses thereof generally mean determining if a match (e.g., identical or a prescribed level of correlation) is achieved between meta-information associated with two items under analysis.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Cybersecurity Analytic Logic Deployments

Referring to FIG. 1A, a block diagram of an exemplary embodiment of cybersecurity analytic logic 100 operating as a service within a cloud network 110 (e.g., public or private cloud network) is shown. The cybersecurity analytic logic 100 receives and conducts analytics on a submitted object 120, notably an object including one or more scripts (hereinafter, "script object"). In particular, the cybersecurity analytic logic 100 is configured to identify whether an incoming object (e.g., file, web content, electronic mail message, etc.) includes one or more scripts and thereby constitutes a script object 120. Upon detection of the script object 120, the cybersecurity analytic logic 100 is configured to (i) recover code associated with a script, (ii) identify the functional code blocks within the recovered code, (iii) identify "suspicious" functional code blocks that include critical code statements and/or functional code blocks that include evasive code statements structured to evade cyber-threat detection, (iv) determine relationships between the functional code blocks to generate a conditional flow graph identifying the inter-relationship between the functional code blocks forming multiple code execution paths, and (v) encourage execution of certain code execution paths that include one or more functional code blocks including critical code statements (e.g., referred to as "critical code execution paths") and attempt to bypass code execution paths including one or more functional code blocks including evasive code statements (e.g., referred to as "evasive code execution paths").

Herein, the cloud network 110 (e.g., a public cloud network such as Microsoft Azure®, or Amazon Web Services®, or Google Cloud®, etc.) is a fully virtualized, multi-tenant cloud service made available through one or more data centers (not shown). Each data center(s) includes a plurality of servers maintained by a provider of the cloud network 110. The servers include logic, operating as virtual resources, which are offered by the cloud network 110 and made available to the general public over the Internet, over which the script object 120 may be provided. As an illustrative example, the cybersecurity analytic logic 100 may be maintained with cloud-based storage (e.g., non-transitory storage medium represented as a storage instance such one or more S3 storage instances within Amazon Web Services®, etc.) and processed by processor (e.g., a virtual processor as one or more processor-based instances such as EC2 instances within Amazon Web Services®, etc.).

Herein, the operations of the cybersecurity analytic logic 100 (deployed within the cloud network 110) include identifying certain functional code blocks of the script object 120 having critical and/or evasive code statements and directing execution, within a virtual environment, of certain functional code blocks including the critical code statement(s) while attempting to bypass other functional code blocks including evasive code statement(s). In particular, the execution of the script may be controlled by modifying the script to promote the execution of functional code blocks having critical code statements over one or more critical code execution paths. The modification of the script may be conducted iteratively so that, for each iterative processing cycle by the virtual environment, the code associated with that modified script is executed to propagate along a particular code execution path, which is selected in an attempt to avoid one or more functional code blocks that may operate as evasive code.

The event data produced by execution of the script along different critical code execution paths (e.g., behaviors of the virtual machine executing the script along the code execution paths) are gathered for analysis by a classification engine (see FIG. 2) deployed within the cybersecurity analytic logic 100. More specifically, the classification engine may be configured to perform analytics on the collected behaviors to determine a presence of any cyberthreats. Based on this determination, the cybersecurity analytic logic 100 generates one or more alert messages 130 (hereinafter, "alert message(s)") to one or more administrators. The alert message(s) 130 may include a portion of the analytic results, which may be rendered for display and further evaluation by a security administrator. It is contemplated that the generation of alert message(s) 130 may encompass or signal the administrators that the analytic results are accessible.

Although not shown in FIG. 1A, the cybersecurity analytic logic 100 may be configured to aggregate its analytic results to generate a single display (dashboard) to visually illustrate the presence of any potential cyberthreats. Additionally, the cybersecurity analytic logic 100 may be configured to identify the functional code block and/or the code execution path associated with a potential cyberthreat to facilitate a more detailed analysis of the script object 120 by a forensic team.

Referring to FIG. 1B, an exemplary embodiment of a hosted service (on-premises) deployment for the cybersecurity analytic logic 100, which is installed within an on-premises network device 140 is shown. The network device 140 may include a processor (e.g., hardware processor) 150, a non-transitory storage medium (e.g., memory) 152 and a network interface 154, which are communicatively coupled together via one or more transmission mediums 156, for establishing and maintaining communications over a network 158. The operability of the cybersecurity analytic logic 100 is similar to those operations described above.

Referring now to FIG. 1C, an exemplary embodiment of a hybrid cybersecurity analytic logic 100 including a first stage of the cybersecurity analytic logic 100 (hereinafter, "first cybersecurity analytic stage 160") and a second stage of the cybersecurity analytic logic 170 (hereinafter, "second cybersecurity analytic stage 170") is shown. Herein, the first cybersecurity analytic stage 160 may be configured to (i) receive the script object 120 (operation A) and (ii) determine whether a script 180 within the script object 120 is suspicious (operation B). This determination may involve a preliminary analysis of functional code blocks associated with the script 180 to determine whether any of the functional code blocks include at least a critical code statement and/or an evasive code statement.

If the first cybersecurity analytic stage 160 determines that the script 180 is suspicious, at least the script 180 is accessible to the second cybersecurity analytic stage 170 operating as part of the cloud services 110 (operation C). As shown, the suspicious script 180 may be uploaded to the second cybersecurity analytic stage 170. Alternatively, in lieu of the script 180 itself, a reference to a stored location with the contents of the script 180 may be uploaded or the script object 120 may be uploaded to operate as part of cloud services within the cloud network 110.

Upon receipt of the suspicious script object 180 (operation D), the second cybersecurity analytic stage 170 identifies certain functional code blocks of the script 180 that may include evasive code statements. Logic within the second cybersecurity analytic stage 170 is configured to control execution of functional code blocks, within a virtual environment, in efforts to bypass the functional code blocks with the evasive code (operation E). The bypassing may be accomplished by modifying the script 180 in an iterative manner to promote the execution of code associated with code execution paths in efforts to avoid one or more functional code blocks including the evasive code.

During this code execution, behaviors associated with the script 180 and/or the virtual machine of the virtual environment are gathered for analysis by a classification engine deployed within the second cybersecurity analytic stage 170 (operation F). The classification engine may be configured to perform analytics on the collected behaviors to determine a presence of any cyberthreats, where the alert message(s) 130 are issued to one or more administrators that identify detected cyberthreats (operation G). The processing/storage architecture would be a combination of the architectures described for FIGS. 1A-1B.

Figures 2, 3A:
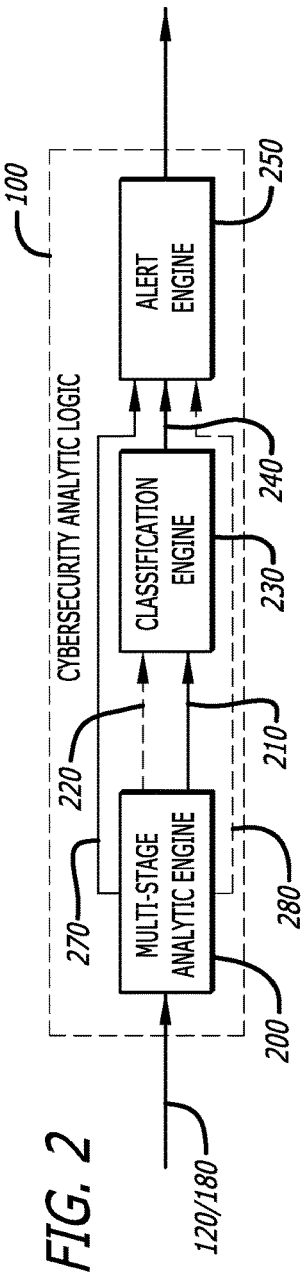
FIG. 2 is an exemplary embodiment of the cybersecurity analytic logic of FIGS. 1A-1C.
FIG. 3A is an exemplary embodiment of the multi-stage analytic engine of FIG. 2.

Referring now to FIG. 2, an exemplary embodiment of the cybersecurity analytic logic 100 of FIGS. 1A-1C is shown. According to one embodiment of the disclosure, the cybersecurity analytic logic 100 includes a multi-stage analytic engine 200, a classification engine 230 and an alert engine 250. The multi-stage analytic engine 200 is configured to receive the object 120 and conduct analytics on the script 180 included as part of the object 120. As an example, these analytics may include, but are not limited or restricted to the following: (i) segmenting code associated with the script 180 into a plurality of functional code blocks, (ii) determining relationships between the plurality of functional code blocks that identify one or more code execution paths that identify potential execution flows of the code forming the script 180, and (iii) determining whether any of the functional code blocks may include critical code statements and/or evasive code statements.

Herein, the analytics are conducted by logic within the multi-stage analytic engine 200 to determine what modifications to the code within the script 180, if any, are necessary to direct execution to the functional code block(s) with one or more critical code statements instead of the functional code blocks with one or more evasive code statements. Such code modifications may be made in an iterative manner (e.g., sequential and independent modification of the script 180) to promote the execution of functional code blocks, within a virtual environment, where evasive code statements may have intentionally delayed or precluded their execution if analyzed by conventional analysis systems. The multi-stage analytic engine 200 is further configured to monitor for behaviors 210 that occur during execution of a modified script (e.g., behaviors 210 of the virtual environment and/or the script 180).

The multi-stage analytic engine 200 may be further configured to determine whether the submitted object 120 is malicious or benign, based on prior analytic results conducted on the submitted object. Upon detecting malicious results for the submitted object 120, the multi-stage analytic engine 200 may route the uncovered malicious results to the alert engine 250 via a first communication path 270 for subsequent reporting through the alert message(s) 130. Alternatively, upon detecting benign results for the submitted object 120, the multi-stage analytic engine 200 may route the uncovered benign results to the alert engine 250 via a second communication path 280 for subsequent reporting through the alert message(s) 130.

The classification engine 230 may be configured to receive (passively or actively retrieve) some or all of the behaviors 210 along with meta-information 220 associated with the script object 120. This meta-information 220 may include information identifying a source of the script object 120 (e.g., source address, host name, etc.), a destination of the script object 120 (e.g., destination address, etc.), name of the script object 120, time of receipt, or the like. As part of the meta-information 220, the classification engine 230 may be configured to receive information associated with the conditional flow graph (e.g., names of functional code blocks including critical code statements and/or evasive code statements, representation of the conditional flow graph, etc.).

Thereafter, the classification engine 230 is configured to determine whether the script object 120 is malicious based at least on the behaviors 210 monitored by the multi-stage analytic engine 200. The collected behaviors 210 may be received by the classification engine 230 (i) after execution of each modified script that encourages execution away from any evasive code execution path of the script 180 or (ii) as an aggregate of behaviors produced by execution of one or more modified scripts targeting all of the code execution paths forming the script 180, or (iii) as an aggregate of behaviors produced by execution of one or more modified scripts over a subset of these code execution paths if the total time allocated for analysis of the modified scripts would be exceeded if all of the code execution paths are analyzed. This subset of code execution paths may be selected based, at least in part, on a priority assigned to each code execution path using threat weight values as described below (e.g., choosing code execution paths starting at a top-level functional code block with the highest threat weight value and selecting subsequent functional code blocks based on the threat weight value associated with the functional code block).

The classification engine 230 may assign a cyberthreat score to the script object 120 based on a level of correlation between the monitored events (e.g., behaviors, sequence of behaviors, meta-information associated with the script object 120, etc.) and events associated with known malware (e.g., malicious behaviors and/or sequences of behaviors of previously identified malware, behaviors and/or sequences of behaviors of legitimate code). If the cyberthreat score exceeds a threshold, the script object 120 is associated with a cyberthreat, and thus, the script object 120 is classified as malicious.

Analytic results 240 produced by the classification engine 230 are provided to the alert engine 250. The alert engine 250 is configured to organize the results 240 associated with the analyses performed on the script object 120 and provide an alert message(s) 260 in the form of a message (e.g., "threat warning" text or other electronic message) or a displayable report generated and made available to a security administrator (e.g., accessible via a portal or received as part of a message). The analytic results 240 may include the cyberthreat score determined for the script object 120 as well as behavior(s) associated with a determination of maliciousness, the meta-information 220 associated with the script object 120, which may further include information associated with the conditional flow graph.

Referring now to FIG. 3A, an exemplary embodiment of the multi-stage analytic engine 200 of FIG. 2 is shown. Herein, the multi-stage analytic engine 200 comprises a first (initial) analytic stage 300, a second (intermediary) analytic stage 310 and a third (behavioral) analytic stage 330. Herein, the first analytic stage 300 includes pre-filter logic 305, which configured to conduct an initial classification of an incoming object 120 to determine whether the object 120 is "suspicious." According to one embodiment of the disclosure, the pre-filter logic 305 is configured to classify a submitted object as "suspicious" if the object includes one or more scripts 180 (i.e., object 120 constitutes a script object). However, according to another embodiment of the disclosure, the pre-filter logic 305 may be configured to conduct a preliminary analysis of the script object 120 (e.g., determine whether the script object 120 is from a trusted source, analysis of function names for comparison with functions names used by previously detected malicious script, etc.) to determine whether the script object 120 is malicious (or benign). Responsive to an initial malicious (or benign) classification, the pre-filter logic 305 may bypass further analyses of the script object 120 by the second analytic stage 310 and/or the third analytic stage 330, given that additional analyses of the script object 120 are unnecessary, as represented by communication paths 270 and 280.

Referring still to FIG. 3A, the second (intermediary) analytic stage 310 features conditional flow graph generation logic 312, functional code block weighting logic 314, code execution path prioritization logic 316, script code coverage logic 320, script code modification logic 322, and a data store 318. The second analytic stage 310 provides logic that forms a framework for dynamically modifying suspicious scripts 180 to direct execution of functional code blocks with critical code statements and attempt to bypass functional code blocks with evasive code statements that may prevent detection of malware within the script 180.

According to one embodiment of the disclosure, the conditional flow graph generation logic 312 is configured to receive the script 180 extracted from the script object 120 and generate a conditional flow graph. The conditional flow graph may correspond to a graphical representation of the functional code blocks forming the script 180 and the relationships between these functional code blocks.

Figure 3B:
FIG. 3B is an exemplary embodiment of a code representation of the script object of FIG. 3A.

More specifically, as shown in FIGS. 3A-3B, the conditional flow graph generation logic 312 may be configured to receive the script 180, after being parsed from the script object 120, to identify (i) one or more functional code blocks $350_1$-$350_M$ (M≥1; M=5) included in the script 180 and (ii) relationships between the functional code blocks $350_1$-$350_5$. These relationships may represent the interaction between the functional code blocks $350_1$-$350_5$ forming the script 180, where certain functional code blocks may communicate with other functional code block(s) in accordance with a parent/child relationship.

Figure 3C:
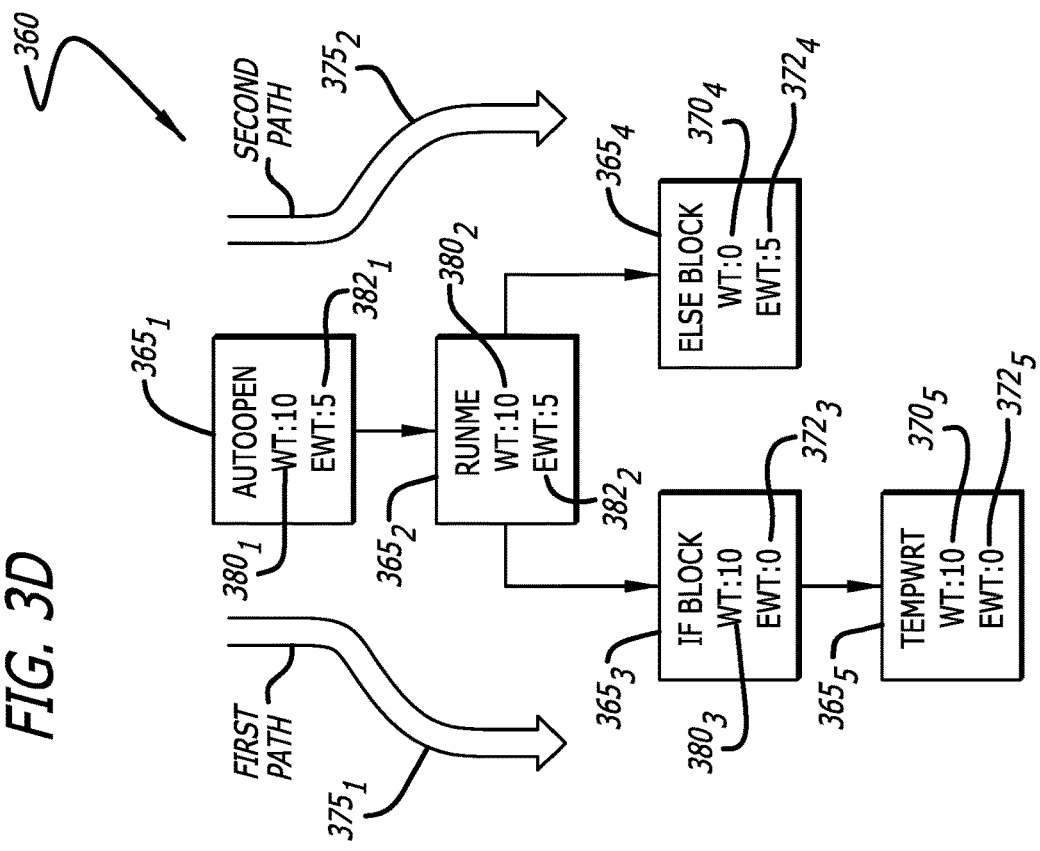
FIG. 3C is an exemplary embodiment of condition flow graph generated by the conditional flow graph generation logic of FIG. 3A.
Figure 3D:
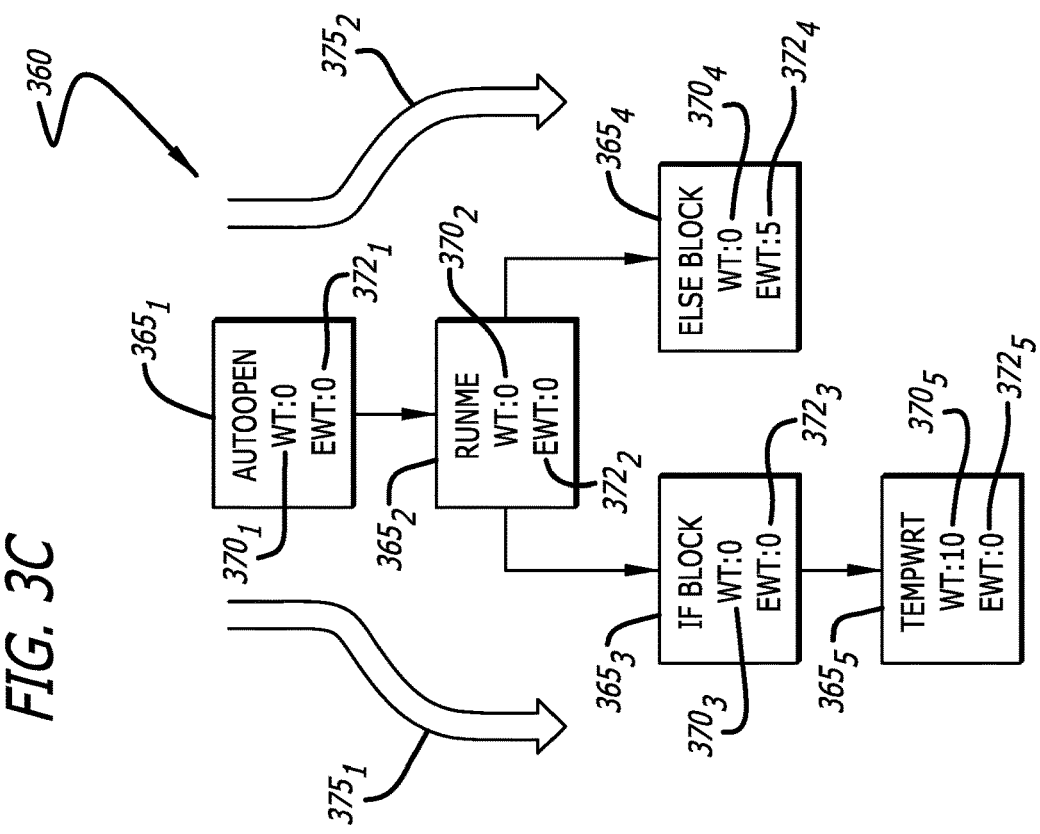
FIG. 3D is an exemplary embodiment of the weighted, prioritized condition flow graph generated by the code path prioritization logic of FIG. 3A.

For example, as shown in FIGS. 3B-3C, the AutoOpen( ) functional code block 350" may be represented as a first node $365_1$ operating as a "parent" functional code block while the CheckMe( ) functional code block $350_2$ may be represented as a second node $365_2$ operating as a "child" functional code block. The relationship is captured with the first node $365_1$ being positioned as a higher-layer functional code block than the second node $365_2$ within the conditional flow graph 360 of FIG. 3C.

Referring to both FIGS. 3B-3C, the conditional flow graph 360 may further include one or more changes in control (e.g., BRANCH instructions, IF-ELSE instructions, JUMP instructions), which may be represented as separate nodes $365_3$-$365_4$ within the conditional flow graph 360. For example, as shown, a change in control (e.g., IF-ELSE statement 355) may correspond functional code blocks $350_3$-$350_4$, which influence the interaction between the CheckMe( ) functional code block $350_2$ and other functional code blocks, such as TempWrt( ) functional code block $350_5$. This interaction is represented by the third node $365_3$ being communicatively coupled to a fifth node $365_5$ representing the TempWrt( ) functional code block $350_5$ and the fourth node $365_4$ concludes operation of the script 180 based on an Application.Quit command 357. The contents of the conditional flow graph 360, representing the interaction between the functional code blocks $350_1$-$350_5$, are made available to the functional code block weighting logic 314 of FIG. 3A.

Herein, according to one embodiment of the disclosure, as shown in FIG. 3C, the functional code block weighting logic 314 may be configured to identify whether any functional code blocks $350_1$-$350_5$ of the script 180 include one or more "critical code statements," namely whether the code statements feature (i) a first level of correlation with code statements associated with known malware and/or (ii) a second level of correlation (substantially less than the first level of correlation) with code statements associated with known goodware. Additionally, the functional code block weighting logic 314 may be further configured to identify whether any functional code blocks $350_1$-$350_5$ of the script 180 include one or more "evasive code statements," namely code that may be used to (i) preclude (halt) the script 180 from completing its execution (e.g., terminates, causes a system crash, etc.) or (ii) intentionally delay execution of other functional code blocks (e.g., use a change of control to unreasonably delay execution).

Thereafter, the functional code block weighting logic 314 assigns a first metric type $370_1$-$370_5$ (hereinafter, "threat weight value") to each functional code block $350_1$-$350_5$, where each threat weight value $370_1$-$370_5$ identifies the likelihood of a corresponding functional code blocks $350_1$-$350_5$ including one or more critical code statements. Similarly, the functional code block weighting logic 314 assigns a second metric type $372_1$-$372_5$ (hereinafter, "evasive weight value") to each functional code block $350_1$-$350_5$, where each evasive weight value $372_1$-$372_5$ identifies the likelihood of a corresponding functional code blocks $350_1$-$350_5$ including one or more evasive code statements.

According to one embodiment, each assigned threat weight value $370_1$, . . . , or $370_5$ may be based, at least in part, on (1) a presence of one or more critical code statements within a particular functional code block and (2) a degree of correlation between the critical code statement(s) within a particular functional code block and critical code statements associated with known malware and/or known goodware. Also, each assigned evasive weight value $372_1$, . . . , or $372_5$ may be based, at least in part, on (1) a presence of one or more evasive code statement(s) within a particular functional code block and/or (2) a degree of correlation between the evasive code statement(s) and evasive code statements associated with known malware. To determine the correlation between the critical (or evasive) code statement(s) within the particular functional code block and the code statements associated with known malware and/or known goodware, the functional code block weighting logic 314 may be configured with access to a data store 325 including cybersecurity intelligence, including code statements associated with known malicious code or known benign code that are previously detected by the cybersecurity analytic logic 100, other cybersecurity analytic logic deployments, third party sources, or the like. Also, threat weight values, evasive weight values, and a mapping between the values and corresponding condition/evasive code statements may be stored.

Furthermore, if multiple (i.e., two or more) critical (or evasive) code statements are included as part of a certain functional code block, the total threat weight value for a certain functional code block may be computed in accordance with any number of weighting computations. For instance, if multiple critical code statements are included within a functional code block, the threat weight value for this functional code block may be an aggregate of the threat weight values assigned to each critical code statement. Alternatively, the threat weight value for this functional code block may be assigned an average of the threat weight values assigned to each critical code statement, a minimum threat weight value for multiple critical code statements, a maximum threat weight value for multiple critical code statements, a determined threat weight value with an additional threat weight value enhancement given multiple critical code statements are included as part of the certain functional code block. Similarly, a threat weight value applied to a functional code block with no critical code statements (e.g., functional code block $350_1$-$350_4$) may be set to "zero", where the threat weight values are increased based on a potential severity of malicious of the critical code statements.

Similarly, if multiple evasive code statements are included within a functional code block, the evasive weight value for this functional code block may be an aggregate of the evasive weight values assigned to each critical code statement. Alternatively, the evasive weight value for this functional code block may be assigned the average of the evasive weight values assigned to each evasive code statement, the minimum evasive weight value for multiple evasive code statements, the maximum evasive weight value for multiple evasive code statements, a determined evasive weight value with a prescribed reduction in the evasive weight value given multiple evasive code statements are included as part of the certain functional code block. Similarly, an evasive weight value applied to a functional code block with no evasive code statements (e.g., functional code block $350_1$-$350_3$ and $350_5$) may be set to "zero", where the evasive weight values may be static or decreased based on a potential severity of evasiveness of the evasive code statements.

Referring to FIGS. 3A & 3C, the code execution path prioritization logic 316 is configured to distribute the determined threat weight values $370_1$-$370_5$ for the functional code blocks $350_1$-$350_5$ to identify code execution paths $375_1$-$375_L$ (L≥1; L=2) for each execution thread. Herein, a first code execution path $375_1$ (associated within weighted functional code blocks represented by nodes $365_1$-$365_3$ & $365_5$) includes a critical code statement 358 while a second code execution path $375_2$ (associated within weighted functional code blocks represented by nodes $365_1$-$365_2$ & $365_4$) includes evasive code statement 355/357 (e.g., Application. Quit command 357). According to one embodiment of the disclosure, the code execution path prioritization logic 316 continues to propagate threat weight values associated with functional code blocks represented by nodes $365_2$-$365_5$, starting with a lowest layered node $365_4$ and $365_5$ for each code execution path $375_2$ and $375_1$ of the conditional flow graph 360. This threat weight value propagation scheme continues until re-assignment of the weight value $365_1$ to the first node $365_1$ associated with the highest layer functional code block $350_1$ is conducted.

More specifically, as shown in FIG. 3D for illustrative purposes, code execution path prioritization logic 316 may determine the threat weight value $370_5$ associated with the lowest level functional code block(s) represented as the fifth node $365_5$ within the conditional flow graph 360. This threat weight value $370_5$ (wt=10) may be propagated upward in the conditional flow graph 360 to a neighboring higher-level node $365_3$, where this threat weight value $370_5$ is combined with the weight value $370_3$ of the third node $365_3$. This weight value propagation scheme, combining the threat weight value of each "child" functional code block (e.g., threat weight value $370_5$ of the functional code block $350_5$) with the threat weight value of its neighboring "parent" functional code block (e.g., threat weight value $370_3$ of the functional code block $350_3$), produces a re-assigned threat weight value $380_3$ for the "parent" functional code block $350_3$ being part of the conditional flow graph 360. The evasive weight values $372_1$-$372_2$ are re-assigned throughout the functional code block $350_1$-$350_2$. It is noted that the upward value propagation is described, although a person skilled in the art may be a variety of schemes to identify conditional and/or evasive code such as the use of tags, or the like.

Thereafter, the code execution path prioritization logic 316 is configured to store the content associated with the conditional flow graph 360. The contents may include, but is not restricted or limited to the following: content of the functional code blocks $350i$-$350_5$; reassigned threat weight values $380_1$-$380_3$ (as initial threat weight values $370_4$-$370_5$ remain unchanged); reassigned evasive weight values $382_1$-$382_2$ (as initial evasive weight values $372_3$-$372_5$ associated with these functional code blocks $350_3$-$350_5$; and/or identifiers are associated with each code execution paths $375_1$-

$375_2$ to which each functional code block $350_1$-$350_5$ pertains. The contents may be stored within the data store 318 for subsequent access by the script code coverage logic 320.

Referring to both FIG. 3A and FIG. 3D, as certain changes in the flow of execution, represented by the code execution paths (e.g., $375_1$-$375_2$), may indicate an evasion capability in the script object 120, the script code coverage logic 320 is configured to select a particular code execution path from multiple code execution paths represented by the conditional flow graph 360 starting at a functional code block associated with the highest reassigned threat weight value $380_1$ and avoiding any functional code blocks including one or more evasive code statements (e.g., functional code block $350_4$). After selection of the particular code execution path (e.g., code path $375_1$), the script code coverage logic 320 provides information associated with the conditional flow graph 360 to the script code modification logic 322.

According to one embodiment of the disclosure, the script code coverage logic 320 may rely on the reassigned threat weight value $380_1$ to determine a particular top-layer functional block (and corresponding code execution paths) to evaluate. Thereafter, the script code coverage logic 320 may select code execution paths based on the reassigned (and original) threat weight values, thereby ordering analysis of the code execution paths based on threat level (and taking into account evasive weight values when a code execution path branches with the same threat weight values, but different evasive weight values—avoiding the path with the functional code block with a greater likelihood of including an evasive code statement (e.g., higher evasive weight value). According to another embodiment of the disclosure, again, the script code coverage logic 320 may rely on the reassigned threat weight value $380_1$ to determine a particular top-layer functional block (and code execution paths) to evaluate. However, the script code coverage logic 320 may select code execution paths based on the reassigned (and original) evasive weight values and avoiding code execution paths with evasive code by selecting the paths where the evasive weight values decrease for subsequent layered functional code blocks as shown in FIGS. 7A-7C. Of course, the script code coverage logic 320 may conduct other types of determinations (e.g., take path with lesser evasive weight value if the difference between the threat weight values is less than a prescribed value difference, etc.) while still adjusting code under analysis to concentrate on functional code blocks with threat code statements and avoid (and modify) functional code blocks with evasive code statements.

Herein, as shown in FIG. 3E, the script code modification logic 322 is configured to modify content (code) of the script 180 associated with a change of control (hereinafter, "control code 385") to propagate over a selected code execution path (e.g., code execution path $375_1$). This enables the behavioral analytic stage 330 to avoid potential evasive code statements 357 within the functional code block $350_4$. Therefore, by identifying a code execution path with a higher likelihood of malicious code (e.g., code execution path $375_1$ in lieu of code execution path $375_2$ that obfuscates potentially malicious code (critical code statement 358) within functional code block $350_5$), the script code modification logic 322 effectively "forces" a bypass of the evasive code statement 357 within the functional code block $350_4$ (e.g., termination of the CheckMe( ) function when the IF statement is FALSE). The bypassing of the evasive code statement 357 is conducted to (i) encourage execution of potential malicious code (critical code statement 358) contained within the script 180 that may be obfuscated (or hidden) and (ii) achieve a more accurate classification of the script object 120 through the encouraged execution. Depending on the number (N) of code execution paths, the script code coverage logic 320 and the script code modification logic 322 may be configured to iteratively modify the script 180 to generate up to "N" modified scripts $390_1$-$390_N$ that execute functional code blocks along different code execution paths.

Referring back to FIG. 3A, the third (behavior) analytic stage 330 includes virtualization logic 340 and object processing logic 345. The virtualization logic 340 is configured to (i) receive, from the script code modification logic 322, modified scripts $390_1$-$390_N$ that encourages analyses of different code execution paths and (ii) provision the object processing logic 345 for execution of these modified scripts $390_1$-$390_N$. According to one embodiment of the disclosure, the object processing logic 345 may include one or more virtual machine instances, which are provisioned by the virtualization logic 340 in accordance with a guest image (e.g., an operating system and one or more applications). The guest image may be factory-provided and subsequently configurable to provide a virtual environment consistent with a targeted network device and/or may be preconfigured to represent a particular customer's network deployment. The virtual machine instance(s) may be used to establish a monitored, virtual environment in which the modified script objects are executed.

The object processing logic 345 is further configured to collect behaviors generated during successive execution of each modified script $390_1$, . . . , $390_N$, especially behaviors generated by functional code blocks along some or all of the non-evasive code execution paths. As described above, the object processing logic 345 receives modified scripts $390_1$, . . . , $390_N$ in an iterative manner as controlled over a feedback loop 395 that signals a request for a next modified script associated with the script object 120 (if any), executes these modified script $390_1$, . . . , $390_N$ and collects behaviors of the virtual machine instance(s) and/or objects themselves for evaluation by the classification engine 230, as described above.

Figure 4A:
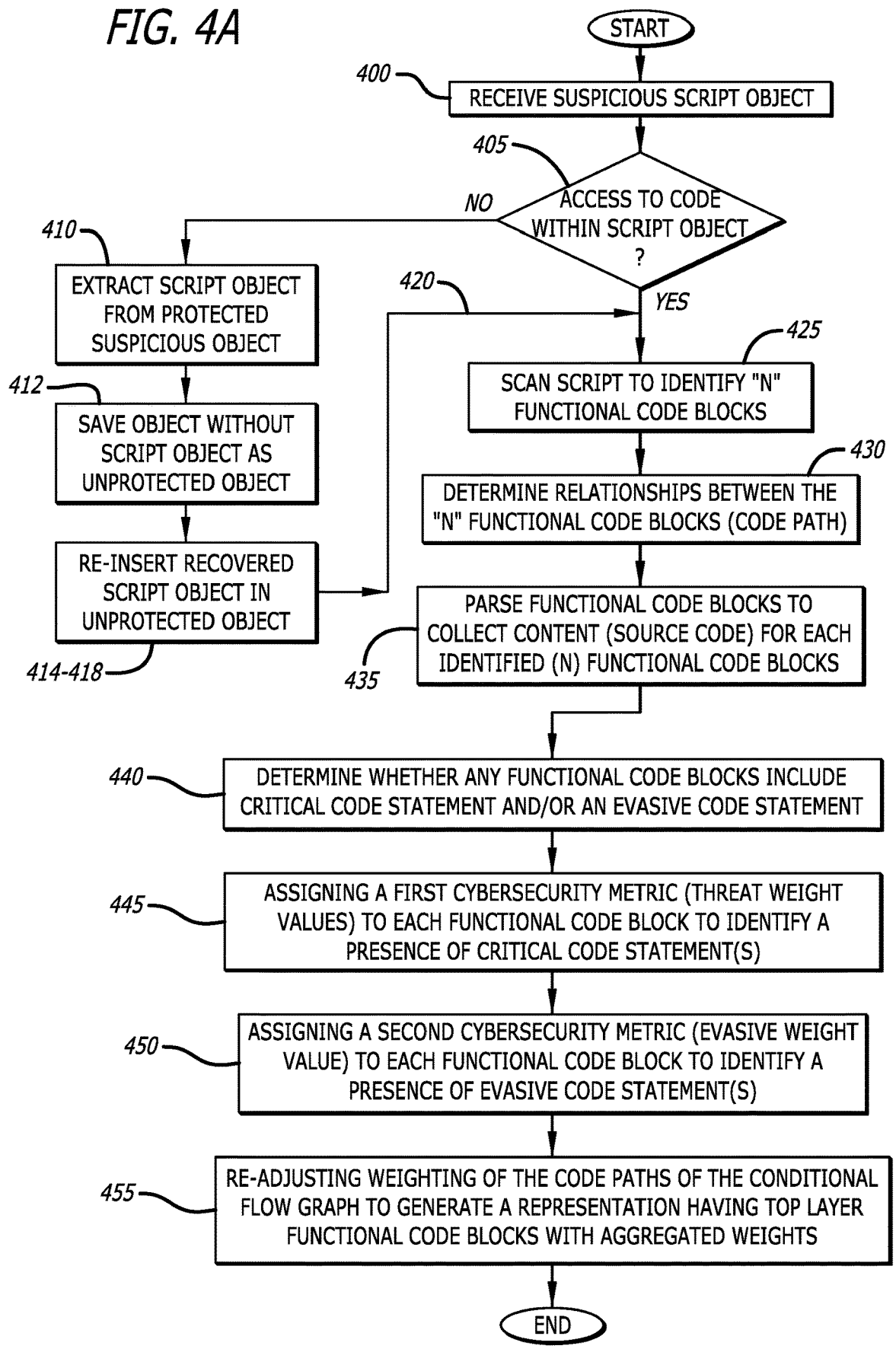
FIG. 4A is an exemplary embodiment of a flowchart illustrating operations conducted by the cybersecurity analytic logic of FIG. 2.

Referring to FIG. 4A, an exemplary embodiment of a flowchart illustrating operations of the cybersecurity analytic logic 100 of FIG. 2 in generating a weighted conditional flow graph is shown. Herein, a suspicious script object is received by the cybersecurity analytic logic (operation 400). Upon receipt of the script object, a determination is made whether code associated with the script being part of the script object is accessible (operation 405). If not, the script is extracted from the protected script object and later re-inserted into an unprotected object without the script to reform an unprotected, script object, as shown in FIG. 4B (operations 410-420).

Figure 4B:
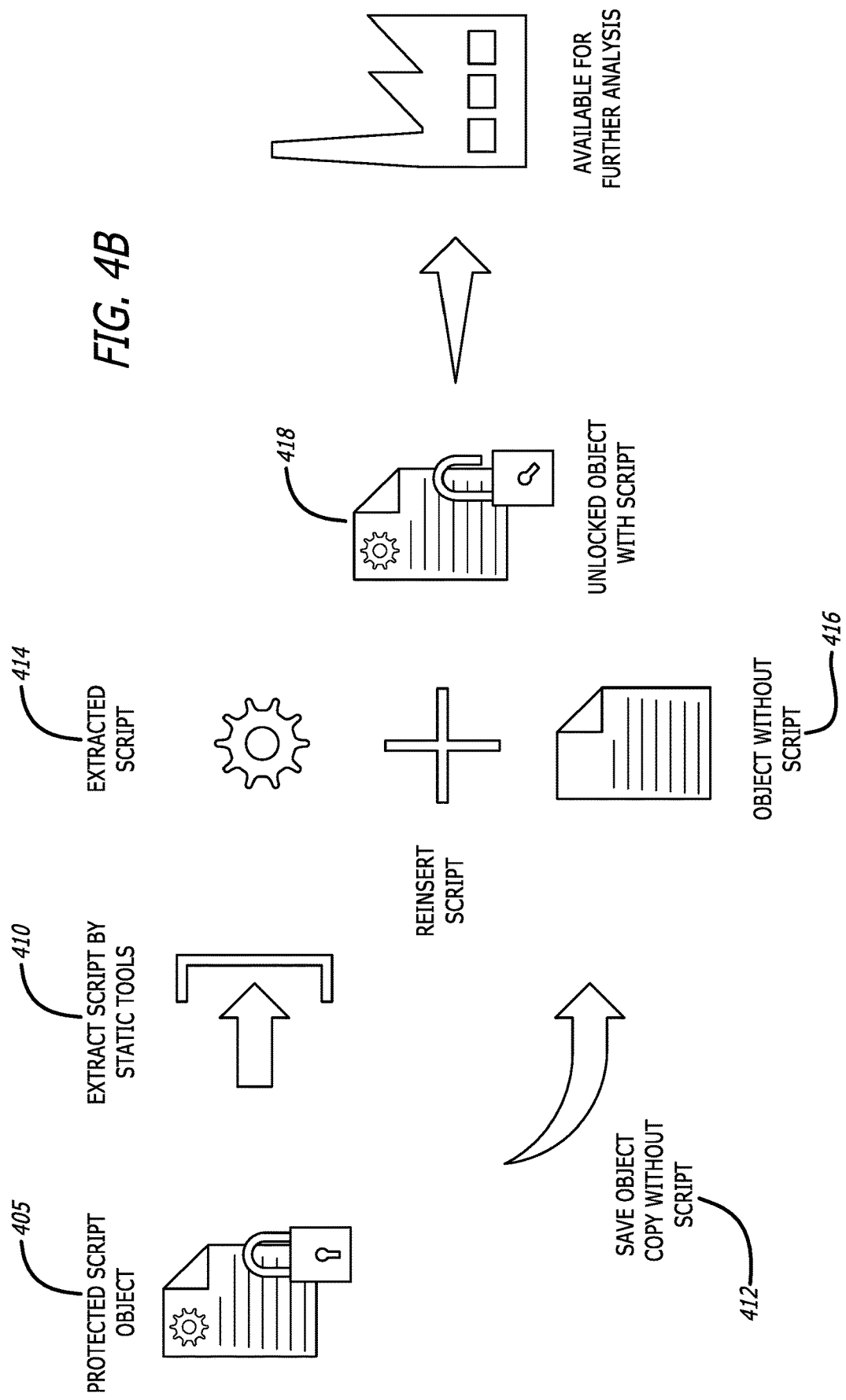
FIG. 4B is a block diagram representing operations of the cybersecurity analytic logic of FIG. 2 when access to code within the script object is unavailable.

As shown in FIG. 4B, upon detecting a protected script object (operation 405), where access to code within the script object is unavailable, a script associated with the script object is extracted (operation 410). As a result, an object without the extracted script (hereinafter, "unprotected object") remains and is saved (operation 412). Thereafter, as illustrated in operations 414, 416 and 418, the extracted script is reinserted into the unprotected object to produce a script object in an unprotected state (hereinafter, an "unprotected script object"). The unprotected script object is reintroduced and subject to further analysis by the conditional flow graph generation logic (operation 420).

Returning back to FIG. 4A, the script associated with the script object under analysis is scanned to identify "N" functional code blocks (operation 425). After identifying these "N" functional code blocks, the cybersecurity analytic logic determines the relationships between the "N" functional code blocks to generate a conditional flow graph (operation 430). The relationships between the "N" functional code blocks establish code execution paths that denote alternative execution flows through the script object. Each code execution paths may be associated with an identifier for use in associating monitored behaviors with the particular thread of execution and the code execution path for that thread.

After identification, the functional code blocks are parsed to identify certain types of content (code statements) from each of these functional code blocks (operations 435). From the content, the functional code block weighting logic determines whether any of the functional code blocks include a critical code statement and/or an evasive code statement (operation 440). The presence (or absence) of critical code statements is relied upon by the functional code block weighting logic in the assignment of threat weight values to each of the functional code blocks in order to generate a weighted conditional flow graph (operations 445, 450 and 455). The weighted conditional flow graph is generated by the code path prioritization logic re-adjusting threat weight values for functional code blocks forming the code execution paths so that a representation of each top-layer functional code blocks identifies aggregated weight values for code execution paths initiating from that top-layer functional code block. The evasive weight values assigned to each of the functional code blocks by the functional code block weighting logic are similarly altered to identify which functional code block(s) may include evasive code statements (based on lesser evasive weight value changes evaluated from top-layer functional code blocks to their lower layer functional code blocks so as to select code execution paths that avoid (or at least delay) execution of the functional code block(s).

According to one embodiment of the disclosure, the functional code block weighting logic may be configured to assign (i) a first cybersecurity metric (e.g., threat weight value) to identify a functional code block including one or more critical code statements and (ii) a second cybersecurity metric (e.g., evasive weight value) to identify a functional code block that includes one or more evasive code statements. Herein, each threat weight value conveys both a presence of one or more critical code statements and a degree of potential maliciousness of the critical code statement(s) (e.g., greater likelihood of malicious code being assigned a greater threat weight value). Each evasive weight value conveys both a presence of one or more evasive code statements and a likelihood of the code statement being evasive (e.g., greater likelihood of evasive code being assigned a lesser (more negative) evasive weight value).

Figure 5:
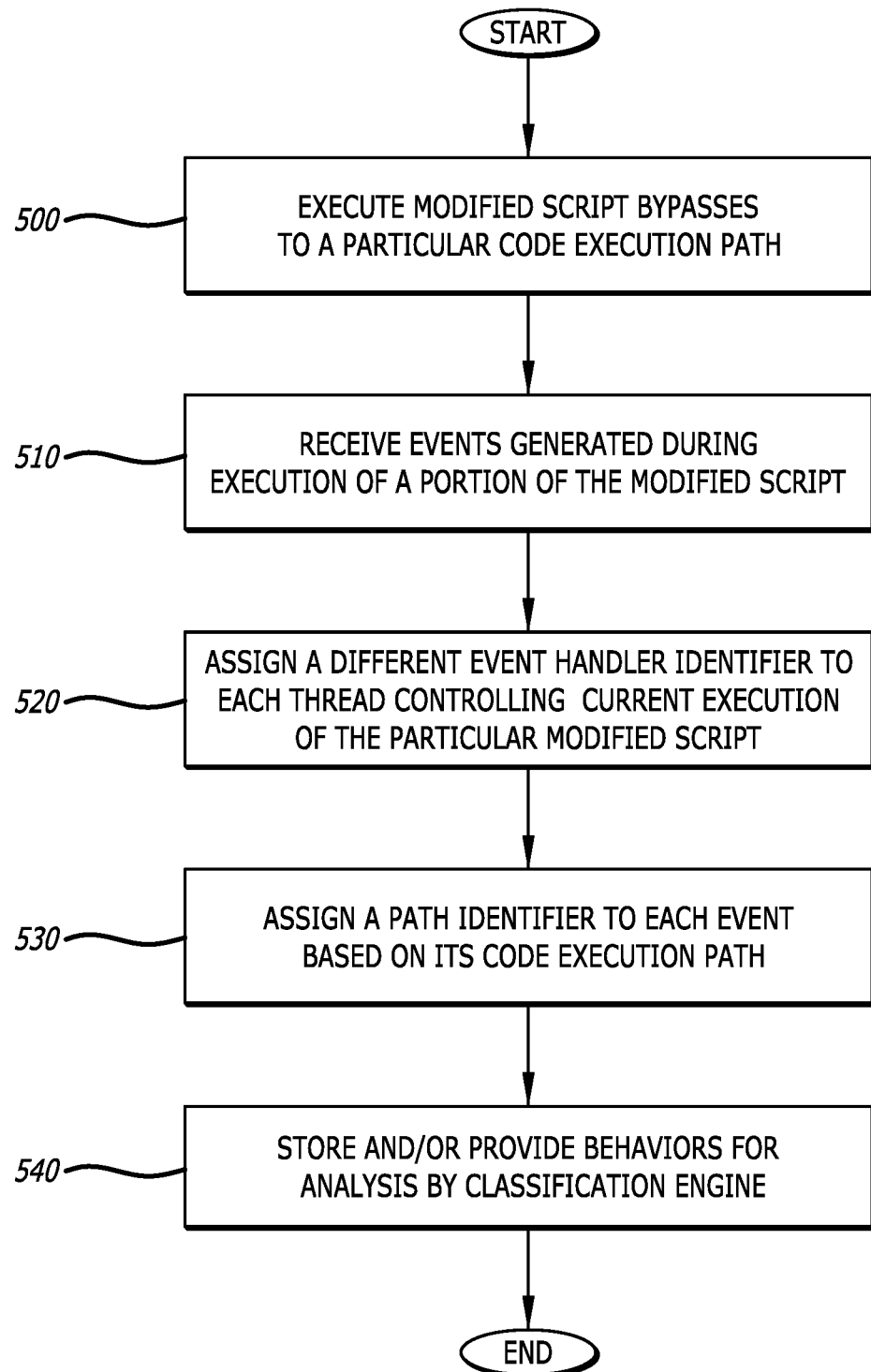
FIG. 5 is an exemplary embodiment of the operations the code path prioritization logic of FIG. 3A to generate content associated with a weighted, prioritized conditional flow graph for storage and retrieval by the script code coverage logic of FIG. 3A.

Referring to FIG. 5, an exemplary embodiment of the operations the object processing logic 345 of the multi-stage analytic engine 200 in tagging events (e.g., behaviors) generated during processing of a modified script object for execution along a particular code execution path is shown. Herein, the object processing logic is configured to execute a portion of the modified script associated with a particular code execution path (operation 500). Each event (e.g., behavior) generated during execution of the modified script is assigned a tag to identify (i) an event handler identifier (e.g., particular thread or process that generated the event) and (ii) a path identifier (operations 510, 520 & 530). Thereafter, the behaviors (and this meta-information associated with the behaviors) may be provided to the classification engine (operation 540).

Herein, the evasion handler identifies a particular thread that is responsible for generation of the event by processing of a particular portion of the script associated with a particular code execution path. The path identifier represents the code execution path in which the event was generated. The path identifier may be configured to correspond to the priority assigned to the code execution path, where a first path identifier corresponds to a code execution path with a highest priority, a second path identifier corresponds to a code execution path with a next highest priority, and the like. This meta-information may be used to identify a location of evasive code and/or malicious code during classification, which may be included as part of the analytic results 240 provided from the classification engine 230 of FIG. 2.

Figure 6:
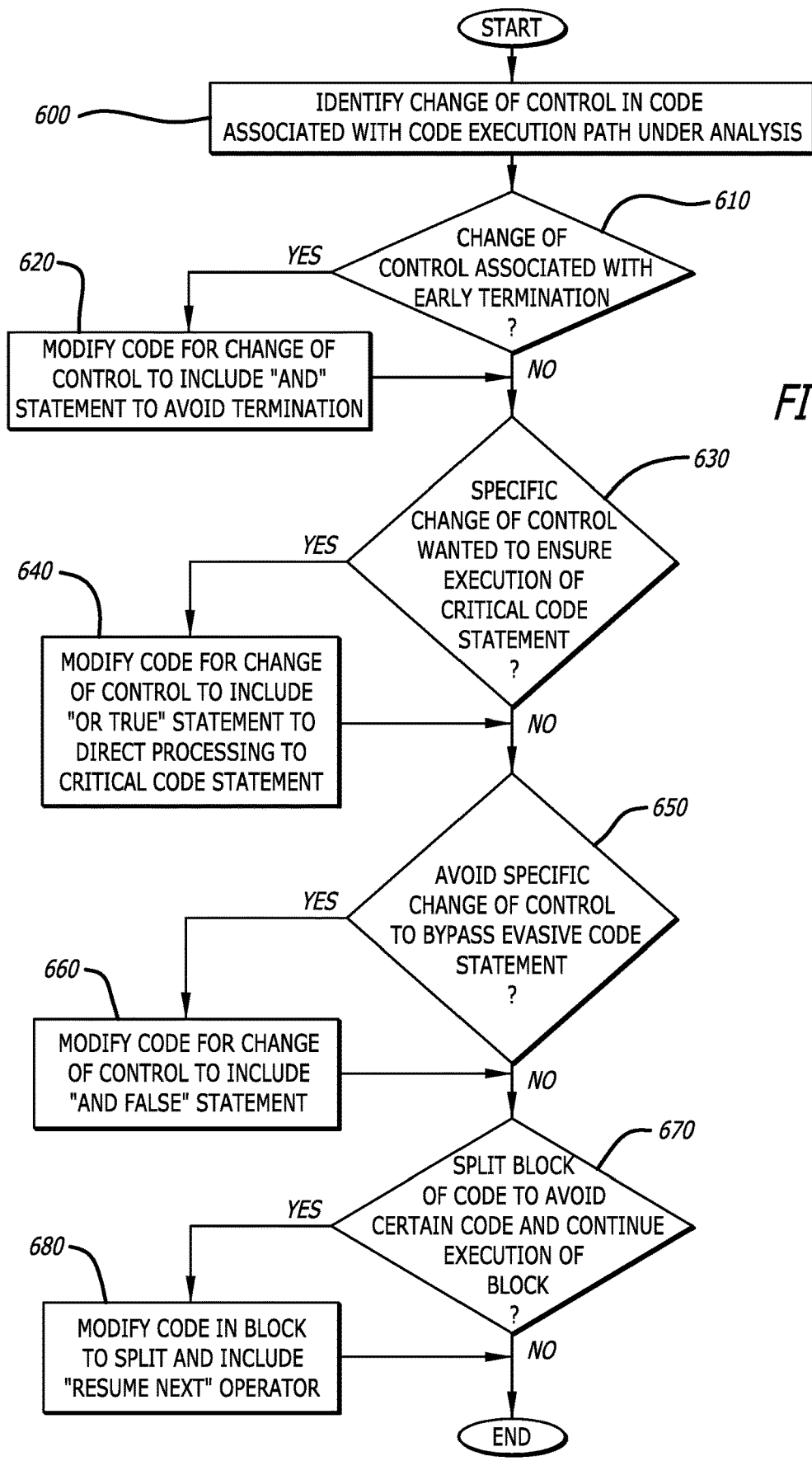
FIG. 6 is an exemplary embodiment of the operations the script code modification logic deployed as part of the multi-stage analytic engine of FIG. 3A.

Referring now to FIG. 6, an exemplary embodiment of the operations the script code modification logic 322 deployed as part of the multi-stage analytic engine 200 of FIG. 3A is shown. Herein, a change of control is identified in the code associated with a code execution path with a script targeted for analysis (block 600). The script code modification logic 322 is configured to determine the type of change of control operation, and modify a portion of the script to control the execution flow.

For example, the script code modification logic 322 may be configured to determine if the change of control condition causes early termination (exit) of the script (block 610). If so, the script code modification logic 322 is configured to modify code associated with the change of control condition to include an "AND" statement to direct execution of the script object to avoid a portion of the script object causing the early termination to occur (block 620).

The script code modification logic 322 may be configured to further determine if execution of the change of control condition is desired to ensure execution of a particular critical code statement (block 630). If so, the script code modification logic 322 may be configured to modify code associated with the change of control condition to include an "OR TRUE" statement to direct execution of the script object to a portion of the script object including the critical code statement (block 640).

As further shown in FIG. 6, the script code modification logic 322 may be further configured to determine if avoidance of a particular execution of the change of control condition is desired (block 650). If so, the script code modification logic 322 may be configured to modify code associated with the change of control condition to include an "AND FALSE" statement to direct execution of the script to a portion of the script other than the evasive code statement (block 660).

Lastly, the script code modification logic 322 may be further configured to determine if a split of a functional code block to avoid certain code and continue execution of the script object is desired (block 670). If so, the script code modification logic 322 may be configured to modify code associated with the change of control condition to include a "RESUME NEXT" operator to direct execution of the script object to certain code with the change of control condition instead of precluding execution of code associated with the particular functional code block (block 680).

Referring to FIG. 7A, an exemplary embodiment of an illustrative condition flow graph 700 of an exemplary script implemented as part of a script object is shown. Herein, a first functional code block may be represented as a first node 710 operating as a "parent" functional code block while a second functional code block may be represented as a second node 715 and operate as a "child" functional code block. The relationship is captured with the first node 710 being positioned within the conditional flow graph as a higher-layer functional code block than the second node 715.

The conditional flow graph 700 may further include one or more changes in control, such as a first change of control 715 (e.g., IF code statement) represented as a third node 720 and a second change of control (e.g., ELSEIF code statement) represented by a fourth node 725. As shown, the first change in control 715 transitions to a third functional code block, represented by a fifth node 730, when the IF code statement returns a TRUE. Otherwise, the second change of control 725 transitions to either a fourth functional code block (represented by a sixth node 735) when the ELSEIF code statement is TRUE or a fifth functional code block (represented by an eighth node 745) when the ELSEIF code statement is FALSE and the ELSE code statement (represented by an eighth node 740) is TRUE.

According to this illustrative embodiment, the functional code block weighting logic is configured to identify functional code blocks that include one or more critical code statements and assign a first metric to those functional code blocks. Herein, the functional code block weighting logic identifies the third, fourth and fifth functional code blocks 730, 735, 745 may include one or more critical code statements while the IF code statement 720 may be potentially classified as another critical code statement. The threat weight values (wt) $750_3$, $750_5$-$750_6$ and $750_8$ associated with nodes 720, 730, 735 and 745 correspond to a different values, such as a first threat weight value (e.g., wt=5), a second threat weight value (e.g., wt=10), a third threat weight value (e.g., wt=8) and a fourth threat weight value (e.g., wt=6), respectively. As stated above, the assignment of the threat weight values would be based on levels of correlation of the critical code statements to code statements associated with known malware and/or code statements associated with known goodware. A threat weight value of zero identifies that, according to the analyses of the corresponding code does not include any critical code statements.

Similarly, the functional code block weighting logic is configured to identify the fourth functional code block 735 includes one or more evasive code statements, and thus, is fourth functional code block 735 is assigned an evasive weight value $770_6$ (ewt=5) to identify the code block 735 potentially includes evasive code. As stated above, the assignment of the evasive weight value could be based on levels of correlation of the evasive code statement to code statements associated with known malware with evasive capabilities and/or to code statements associated with known goodware.

Referring now to FIG. 7B, an exemplary embodiment of the weighted, prioritized condition flow graph of the script object of FIG. 7A is shown. Herein, the code execution path prioritization logic of FIG. 3A may determine the threat weight value $750_8$ associated with the lowest level functional code block(s) represented as the eight node 745 within the conditional flow graph 700. This threat weight value $750_8$ (wt=6) may be propagated upward in the conditional flow graph 700 to a neighboring higher-level node (e.g., seventh node 740), where this threat weight value $750_8$ is combined with the weight value $750_7$ of the seventh node 740. This weight value propagation scheme continues to reassign threat weight values of each "child" functional code block with the threat weight value of its neighboring "parent" functional code block, produces the weighted, prioritized conditional flow graph 760. The evasive weight values $770_1$-$770_8$ may be conducted in accordance with a similar propagation scheme associated with the particular nodes 710-745, respectively.

Thereafter, as shown in FIG. 7C, the script code coverage logic is configured to select a first code execution path 780 from multiple code execution paths 780-782 represented by the weighted, prioritized conditional flow graph 760 starting at the functional code block associated with the highest reassigned threat weight value (e.g., first functional code block 710 instead of sixth functional code block 785) and attempting to avoid functional code blocks including one or more evasive code statements (e.g., fourth functional code block 735). After selection of the particular code execution path (e.g., code path 780), the script code coverage logic 320 provides information associated with the weighted, prioritized conditional flow graph 760 to the script code modification logic.

Thereafter, the script code coverage logic may be configured to select a second code execution path 781 originating from the first functional code block 710. According to one embodiment of the disclosure, as the behavioral stage analyses may be conducted concurrently, the second code execution path 781 may be selected from the sequence of nodes reassigned the next highest threat weight value (e.g., third code execution path 782), given that execution of the code associated with the code execution paths may be conducted concurrently. Alternatively, the script code coverage logic may detect that the potential second code execution path 781 includes one or more evasive code statements (e.g., by maintaining a consistent evasive weight value of 5 until the path separation at functional block 725), and as a result, modifies the script to execute the third code execution path 782 prior to the execution of code associated with the second code execution path 781 to delay execution of the evasive code within the script.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for improved detection of cybersecurity threats initiated by a script, comprising:
   a processor; and
   a non-transitory storage medium communicatively coupled to the processor and configured to store
      multi-stage analytic engine configured to analyze the script provided as part of a script object by at least (i) determining whether any functional code blocks forming the script include a critical code statement, (ii) determining whether any of the functional code blocks include an evasive code statement, (iii) modifying the script to control processing of a subset of the functional code blocks by avoiding an execution code path including the evasive code statement and processing functional code blocks forming a code path including the critical code statement, and (iv) executing the modified script and monitoring behaviors of a virtual environment,
      a classification engine configured to receive the behaviors associated with the script to determine whether the script including cybersecurity threats, and
      an alert engine configured to receive results produced from the classification engine and generate one or more alert messages organizing the results of the analyses by the multi-stage analytic engine and results produced from the classification engine.

2. The system of claim 1, wherein the processor corresponds to a processor instance within a cloud network and the non-transitory storage medium corresponds to a storage instance within the cloud network.

3. The system of claim 1, wherein the multi-stage analytic engine includes a first analytic stage configured to conduct an initial evaluation of an incoming object to determine whether the object includes the script and corresponds to the script object, a second analytic stage to process the script to recover behaviors based on analysis within the second analytic stage, and a third analytic stage to collect behaviors generated during execution of the modified script.

4. The system of claim 3, wherein the first analytic stage of the multi-stage analytic engine includes pre-filter logic that is configured to further conduct a preliminary analysis of the script object and either (i) provide the script associated with the script object to the second analytic stage when a classification of the script object is inconclusive or (ii) bypass the second analytic stage and the third analytic stage when the script object is classified as benign or malicious.

5. The system of claim 3, wherein the second analytic stage of the multi-stage analytic engine includes conditional flow graph generation logic configured to (i) receive the script from the first analytic stage, after being parsed from the script object, (ii) identify (a) the functional code blocks included in the script and (b) relationships between the functional code blocks, wherein the relationships represent one or more interactions between the functional code blocks forming the script, and (iii) generate a conditional flow graph representing the functional code blocks and the relationships between the functional code blocks.

6. The system of claim 5, wherein the second analytic stage of the multi-stage analytic engine further includes functional code block weighting logic configured to determine whether any of the functional code blocks include a critical code statement by at least (i) analyzing code statements within each functional code block of the functional code blocks to determine whether at least a first level of correlation exists between a code statement within a functional code block of the functional code blocks and code statements associated with known malware and (ii) assigning a threat weight value to identify a likelihood of the functional code block including a critical code statement.

7. The system of claim 6, wherein the second analytic stage of the multi-stage analytic engine further includes functional code block weighting logic configured to determine whether any of the functional code blocks include an evasive code statement by at least (i) analyzing code statements within each functional code block of the functional code blocks to determine whether any of the code statements include code that precludes or halts the script from completing its execution or intentionally delays execution of other functional code blocks, and (ii) assigning an evasive weight value to identify a likelihood of the functional code block including an evasive code statement.

8. The system of claim 7, wherein the second analytic stage of the multi-stage analytic engine further includes code execution path prioritization logic configured to distribute both threat weight values and evasive weight values assigned to each of the functional code blocks to identify the code execution path including the evasive code statement.

9. The system of claim 1, wherein the virtual environment corresponds to one or more virtual machines.

10. The system of claim 1, wherein the multi-stage analytic engine to analyze the script associated with the script object and, upon detecting that the script object is a protected script object where access to code within the script object is unavailable, extract the script from the script object to produce the script and an unprotected object, store the unprotected object and reinsert the extracted script into the unprotected object to produce the script object for analysis.

11. A computerized method for improved detection of cybersecurity threats initiated by a script, comprising:
    analyzing the script provided as part of a script object by at least (i) determining whether any functional code blocks forming the script include a critical code statement, (ii) determining whether any of the functional code blocks include an evasive code statement, (iii) modifying the script to control processing of a subset of the functional code blocks by avoiding an execution code path including the evasive code statement and processing functional code blocks forming a code path including the critical code statement, and (iv) monitoring behaviors during execution of the modified script; and
    determining whether the script including cybersecurity threats based on the monitored behaviors.

12. The computerized method of claim 11, wherein prior to analyzing the script, the computerized method further comprising:
    conducting an initial evaluation of an incoming object to determine whether the object includes the script and corresponds to the script object.

13. The computerized method of claim 11, wherein prior to determining whether any functional code blocks forming the script include a critical code statement, the computerized method further comprising:
    conducting a preliminary analysis of the script object and either (i) providing the script associated with the script object to a second analytic stage being logic configured to determine whether any functional code blocks forming the script include a critical code statement or (ii) bypassing the second analytic stage when the script object is classified as benign or malicious.

14. The computerized method of claim 11, wherein prior to determining whether any functional code blocks forming the script include a critical code statement, the computerized method further comprising:
    receiving the script, after being parsed from the script object,
    identifying (a) the functional code blocks included in the script and (b) relationships between the functional code blocks, wherein the relationships represent one or more interactions between the functional code blocks forming the script, and
    generating a conditional flow graph representing the functional code blocks and the relationships between the functional code blocks.

15. The computerized method of claim 14, wherein the determining whether any of the functional code blocks include a critical code statement comprises (i) analyzing code statements within each functional code block of the functional code blocks to determine whether at least a first level of correlation exists between a code statement within a functional code block of the functional code blocks and code statements associated with known malware and (ii) assigning a threat weight value to identify a likelihood of the functional code block including a critical code statement.

16. The computerized method of claim 15, wherein the determining whether any of the functional code blocks include an evasive code statement comprises (i) analyzing code statements within each functional code block of the functional code blocks to determine whether any of the code statements include code that precludes or halts the script from completing its execution or intentionally delays execution of other functional code blocks, and (ii) assigning an evasive weight value to identify a likelihood of the functional code block including an evasive code statement.

17. The computerized method of claim 16, wherein the modifying of the script to control processing of the subset of the functional code blocks comprises distributing both threat weight values and evasive weight values assigned to each of the functional code blocks to identify the code execution path including the evasive code statement.

18. The computerized method of claim 11, wherein the modified script is executed in a virtual environment, the virtual environment corresponds to one or more virtual machines.

19. The computerized method of claim 11, wherein prior to analyzing the script, the computerized method further comprising:
 analyzing the script associated with the script object; and
 upon detecting that the script object is a protected script object where access to code within the script object is unavailable, extracting the script from the script object to produce the script and an unprotected object, storing the unprotected object, and reinserting the extracted extract into the unprotected object to produce the script object for analysis.

20. A non-transitory storage medium including software that, upon execution by one or more processors, causes the software to detect cybersecurity threats initiated by a script by performing operations comprising:
 analyzing the script by at least (i) determining whether any functional code blocks forming the script include a critical code statement, (ii) determining whether any of the functional code blocks include an evasive code statement, (iii) modifying the script to control processing of a subset of the functional code blocks by avoiding an execution code path including the evasive code statement and processing functional code blocks forming a code path including the critical code statement, and (iv) monitoring behaviors during execution of the modified script; and
 determining whether the script including cybersecurity threats based on the monitored behaviors.

21. The non-transitory storage medium of claim 20, wherein prior to analyzing the script, the software performs further operations comprising:
 conducting an initial evaluation of an incoming object to determine whether the object includes the script and corresponds to the script object.

22. The non-transitory storage medium of claim 20, wherein prior to determining whether any functional code blocks forming the script include a critical code statement, the software performs further operations comprising:
 conducting a preliminary analysis of the script object and either (i) providing the script associated with the script object to a second analytic stage being logic configured to determine whether any functional code blocks forming the script include a critical code statement or (ii) bypassing the second analytic stage when the script object is classified as benign or malicious.

23. The non-transitory storage medium claim 20, wherein prior to determining whether any functional code blocks forming the script include a critical code statement, the software performs further operations comprising:
 receiving the script, after being parsed from the script object,
 identifying (a) the functional code blocks included in the script and (b) relationships between the functional code blocks, wherein the relationships represent one or more interactions between the functional code blocks forming the script, and
 generating a conditional flow graph representing the functional code blocks and the relationships between the functional code blocks.

24. The non-transitory storage medium of claim 20, wherein the determining whether any of the functional code blocks include a critical code statement comprises (i) analyzing code statements within each functional code block of the functional code blocks to determine whether at least a first level of correlation exists between a code statement within a functional code block of the functional code blocks and code statements associated with known malware and (ii) assigning a threat weight value to identify a likelihood of the functional code block including a critical code statement.

25. The non-transitory storage medium of claim 24, wherein the determining whether any of the functional code blocks include an evasive code statement comprises (i) analyzing code statements within each functional code block of the functional code blocks to determine whether any of the code statements include code that precludes or halts the script from completing its execution or intentionally delays execution of other functional code blocks, and (ii) assigning an evasive weight value to identify a likelihood of the functional code block including an evasive code statement.

26. The non-transitory storage medium of claim 25, wherein the modifying of the script to control processing of the subset of the functional code blocks comprises distributing both threat weight values and evasive weight values assigned to each of the functional code blocks to identify the code execution path including the evasive code statement.

27. The non-transitory storage medium of claim 20, wherein the modified script is executed in a virtual environment, the virtual environment corresponds to one or more virtual machines.

* * * * *